US012529928B2

(12) United States Patent
Lim et al.

(10) Patent No.: US 12,529,928 B2
(45) Date of Patent: Jan. 20, 2026

(54) DISPLAY DEVICE INCLUDING A PLURALITY PARTITIONS WITH A CHANGE RATE IN HEIGHT AND/OR WIDTH

(71) Applicant: LG Display Co., Ltd., Seoul (KR)

(72) Inventors: Taemin Lim, Chilgok-gun (KR); Yunho Cho, Paju-si (KR)

(73) Assignee: LG DISPLAY CO., LTD., Seoul (KR)

( * ) Notice: Subject to any disclaimer, the term of this patent is extended or adjusted under 35 U.S.C. 154(b) by 0 days.

(21) Appl. No.: 19/060,367

(22) Filed: Feb. 21, 2025

(65) Prior Publication Data
US 2025/0271607 A1 Aug. 28, 2025

(30) Foreign Application Priority Data
Feb. 22, 2024 (KR) .......................... 10-2024-0025943

(51) Int. Cl.
G02F 1/1335 (2006.01)
B60K 35/22 (2024.01)
F21V 8/00 (2006.01)
G02B 6/35 (2006.01)
G02F 1/13 (2006.01)
G02F 1/13357 (2006.01)

(52) U.S. Cl.
CPC ........ G02F 1/133607 (2021.01); B60K 35/22 (2024.01); G02B 6/0028 (2013.01); G02B 6/0076 (2013.01); G02B 6/3598 (2013.01); G02F 1/1323 (2013.01); G02F 1/133603 (2013.01); G02F 1/133606 (2013.01); G02F 1/133627 (2021.01); G02F 1/133615 (2013.01)

(58) Field of Classification Search
CPC ............. G02F 1/1323; G02F 1/133606; G02F 1/133607
See application file for complete search history.

(56) References Cited

U.S. PATENT DOCUMENTS

| | | | |
|---|---|---|---|
| 2009/0273853 A1* | 11/2009 | Park ....................... | G02B 27/52 359/893 |
| 2020/0003946 A1* | 1/2020 | Klippstein ........ | G02F 1/133617 |
| 2021/0193971 A1* | 6/2021 | Kim .................... | H10K 59/8792 |
| 2023/0101373 A1* | 3/2023 | Kim ..................... | G02B 6/0036 362/613 |

FOREIGN PATENT DOCUMENTS

| | | |
|---|---|---|
| EP | 4 394 491 A1 | 7/2024 |
| KR | 10-2020-0007322 A | 1/2020 |

* cited by examiner

Primary Examiner — Keith G. Delahoussaye
(74) Attorney, Agent, or Firm — Birch, Stewart, Kolasch & Birch, LLP

(57) ABSTRACT

A display device can include a first light source unit having a plurality of first light sources, a light controller disposed on the first light source unit and having a plurality of partitions overlapping at least a partial area of the active area, a second light source unit disposed on the light controller and having a plurality of second light sources, a light guide plate disposed to be parallel to the second light source unit and configured to guide light provided from the second light source unit, and a display panel disposed on the light guide plate and configured to display an image using light provided from the first light source unit or the second light source unit. The partitions can have a different height in each area and a change rate of a height of the partitions can be different in each area.

14 Claims, 12 Drawing Sheets

DISPLAY DEVICE INCLUDING A PLURALITY PARTITIONS WITH A CHANGE RATE IN HEIGHT AND/OR WIDTH

CROSS-REFERENCE TO RELATED APPLICATIONS

This application claims priority to Korean Patent Application No. 10-2024-0025943 filed on Feb. 22, 2024, in the Korean Intellectual Property Office, the entire disclosure of which is hereby expressly incorporated by reference into the present application.

BACKGROUND

Technical Field

The present disclosure relates to an apparatus and particularly to, for example, without limitation, a display device, and more particularly to a display device in which a viewing angle is controllable.

Description of the Related Art

As the technology in modern society develops, display devices are used in various ways to provide information to users. The display devices include not only electronic signs which simply transmit visual information in one direction, but also various electronic devices which need higher level of technology to check a user's input and provide information in response to the checked input.

For example, a display device is included in a vehicle to provide various information to a driver and passengers of the vehicle.

The description provided in the discussion of the related art section should not be assumed to be prior art merely because it is mentioned in or associated with that section. The discussion of the related art section can include information that describes one or more aspects of the subject technology, and the description in this section does not limit the invention.

SUMMARY OF THE DISCLOSURE

The display device of a vehicle needs to appropriately display contents without interrupting the operation of the vehicle. The inventors of the present disclosure have recognized, the display device needs to limit the display of the contents which can reduce the concentration on the driving while the vehicle is in operation.

An object to be achieved by the present disclosure is to provide a display device which provides contents in a first area of an active area at a wide viewing angle and provides contents in a second area at a wide viewing angle or a narrow viewing angle according to a driving mode.

Another object to be achieved by the present disclosure is to provide a display device which minimizes a boundary visibility between a first area and a second area of a display panel.

Objects of the present disclosure are not limited to the above-mentioned objects, and other objects, which are not mentioned above, can be clearly understood by those skilled in the art from the following descriptions.

According to an aspect of the present disclosure, a display device includes a first light source unit including a plurality of first light sources; a light controller which is disposed on the first light source unit and includes a plurality of partitions overlapping at least a partial area of the active area; a second light source unit which is disposed on the light controller and includes a plurality of second light sources; a light guide plate which is disposed to be parallel to the second light source unit and guides light provided from the second light source unit; and a display panel which is disposed on the light guide plate and displays an image using light provided from the first light source unit or the second light source unit, wherein the plurality of partitions has a different height in each area and a change rate of a height of the plurality of partitions can be different in each area.

According to another aspect of the present disclosure, a display device includes a first light source unit including a plurality of first light sources; a light controller which is disposed on the first light source unit and includes a plurality of partitions overlapping at least a partial area of the active area; a second light source unit which is disposed on the light controller and includes a plurality of second light sources; a light guide plate which is disposed to be parallel to the second light source unit and guides light provided from the second light source unit; and a display panel which is disposed on the light guide plate and displays an image using light provided from the first light source unit or the second light source unit, wherein the plurality of partitions has a different width in each area and a change rate of a width of the plurality of partitions can be different in each area.

Other detailed matters of the example embodiments are included in the detailed description and the drawings.

According to aspects of the present disclosure, some of a plurality of light source units disposed below a display panel is controlled to emit light according to a driving mode to control both a first area and a second area as a wide field-of-view mode in a first mode and control a first area as a wide field-of-view mode and a second area as a narrow field-of-view mode in a second mode.

According to aspects of the present disclosure, a height of a partition which controls a viewing angle in each area is designed to be gradually changed around a boundary line between a first area and a second area so that a boundary visibility between the first area and the second area can be minimized.

According to aspects of the present disclosure, a width of a partition which controls a viewing angle in each area is designed to be gradually changed around a boundary line between a first area and a second area so that a boundary visibility between the first area and the second area can be minimized.

The effects according to aspects of the present disclosure are not limited to the contents exemplified above, and more various effects are included in the present specification.

The effects of the present disclosure are not limited to the aforementioned effects, and other effects, which are not mentioned above, will be apparently understood to a person having ordinary skill in the art from the following description.

The objects to be achieved by the present disclosure, the means for achieving the objects, and the effects of the present disclosure described above do not specify essential features of the claims, and, thus, the scope of the claims is not limited to the disclosure of the present disclosure.

Other systems, methods, features and advantages will be, or will become, apparent to one with skill in the art upon examination of the following figures and detailed description. It is intended that all such additional systems, methods, features and advantages be included within this description, be within the scope of the present disclosure. Further aspects and advantages are discussed below in conjunction with embodiments of the disclosure.

It is to be understood that both the foregoing general description and the following detailed description are exemplary and explanatory and are intended to provide further explanation of the inventive concepts as claimed.

BRIEF DESCRIPTION OF THE DRAWINGS

The above and other aspects, features and other advantages of the present disclosure will be more clearly understood from the following detailed description taken in conjunction with the accompanying drawings, in which.

Figure 1:
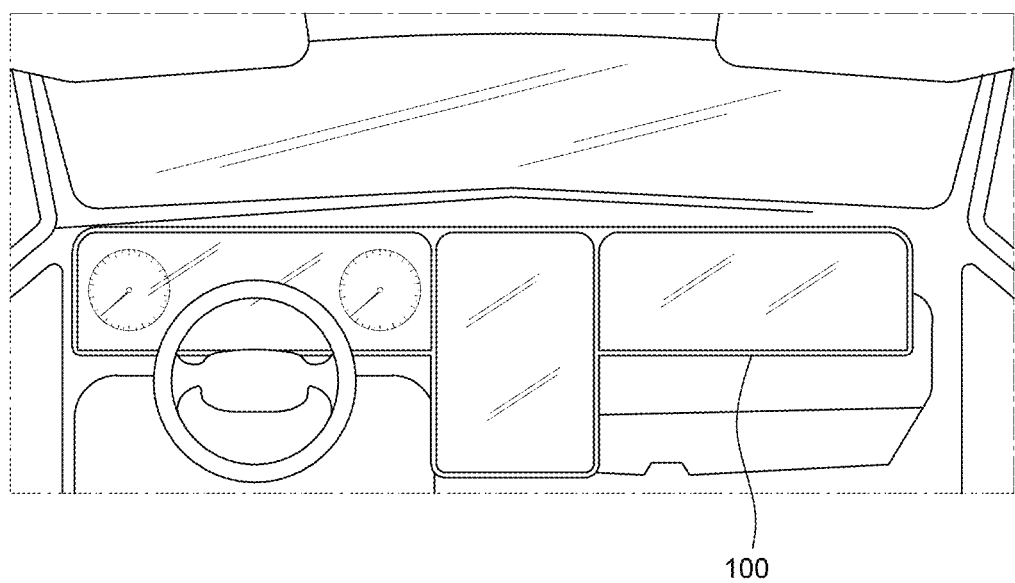
FIG. 1 is an example view of a display device according to an example embodiment of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience.

DETAILED DESCRIPTION OF THE EMBODIMENTS

Advantages and characteristics of the present disclosure and a method of achieving the advantages and characteristics will be clear by referring to example embodiments described below in detail together with the accompanying drawings. However, the present disclosure is not limited to the example embodiments disclosed herein but will be implemented in various forms. The example embodiments are provided by way of example only so that those skilled in the art can fully understand the disclosures of the present disclosure and the scope of the present disclosure.

Throughout the drawings and the detailed description, unless otherwise described, the same drawing reference numerals should be understood to refer to the same elements, features, and structures. The relative size and depiction of these elements can be exaggerated for clarity, illustration, and convenience. The progression of processing steps and/or operations described is an example; however, the sequence of steps and/or operations is not limited to that set forth herein and can be changed as is known in the art, with the exception of steps and/or operations necessarily occurring in a particular order. Like reference numerals designate like elements throughout. Names of the respective elements used in the following explanations are selected only for convenience of writing the specification and can be thus different from those used in actual products.

The shapes, sizes, ratios, angles, numbers, and the like illustrated in the accompanying drawings for describing the example embodiments of the present disclosure are merely examples, and the present disclosure is not limited thereto. Like reference numerals generally denote like elements throughout the specification. Further, in the following description of the present disclosure, a detailed explanation of known related technologies can be omitted or can be briefly provided to avoid unnecessarily obscuring the subject matter of the present disclosure. The terms such as "including," "having," and "consist of" used herein are generally intended to allow other components to be added unless the terms are used with the term "only". Any references to singular can include plural unless expressly stated otherwise.

Components are interpreted to include an ordinary error range even if not expressly stated.

When the position relation between two parts is described using the terms such as "on", "above", "below", and "next", one or more parts can be positioned between the two parts unless the terms are used with the term "immediately" or "directly".

When an element or layer is disposed "on" another element or layer, a third layer or element can be interposed between the element or layer and another element or layer.

The expression of a first element, a second elements "and/or" a third element should be understood as one of the first, second and third elements or as any or all combinations of the first, second and third elements. By way of example, A, B and/or C can refer to only A; only B; only C; any or some combination of A, B, and C; or all of A, B, and C.

The term "at least one" should be understood as including any and all combinations of one or more of the associated listed items. For example, the meaning of "at least one of a first element, a second element, and a third element" encompasses the combination of all three listed elements, combinations of any two of the three elements, as well as each individual element, the first element, the second element, or the third element.

Unless otherwise defined, all terms (including technical and scientific terms) used herein have the same meaning as commonly understood by one of ordinary skill in the art to which example embodiments belong. It will be further understood that terms, such as those defined in commonly used dictionaries, should be interpreted as having a meaning for example consistent with their meaning in the context of the relevant art and should not be interpreted in an idealized or overly formal sense unless expressly so defined herein. For example, the term "part" or "unit" can apply, for example, to a separate circuit or structure, an integrated circuit, a computational block of a circuit device, or any structure configured to perform a described function as should be understood to one of ordinary skill in the art.

Rather, these embodiments can be provided so that this disclosure can be sufficiently thorough and complete to assist those skilled in the art to fully understand the scope of the present disclosure.

Although the terms "first", "second", and the like are used for describing various components, these components are not confined by these terms. These terms are merely used for distinguishing one component from the other components and may not define order or sequence. Therefore, a first component to be mentioned below can be a second component in a technical concept of the present disclosure.

Like reference numerals generally denote like elements throughout the specification. Further, the term "can" fully encompasses all the meanings and coverages of the term "may" and vice versa.

A size and a thickness of each component illustrated in the drawing are illustrated for convenience of description, and the present disclosure is not limited to the size and the thickness of the component illustrated.

The features of various embodiments of the present disclosure can be partially or entirely adhered to or combined with each other and can be interlocked and operated in technically various ways, and the embodiments can be carried out independently of or in association with each other.

Hereinafter, a display device according to example embodiments of the present disclosure will be described in detail with reference to accompanying drawings. All the components of each display device according to all embodiments of the present disclosure are operatively coupled and configured.

FIG. 1 is an example view of a display device according to an example embodiment of the present disclosure.

Referring to FIG. 1, a display device 100 can be disposed in at least a part of a dash board of a vehicle or any other transportation medium. The dash board of the vehicle includes a configuration disposed in a front surface of front seats (for example, a driver seat and a front passenger seat) of the vehicle. For example, on the dash board of the vehicle, an input configuration for manipulating various functions (for example, an air-conditioner, an audio system, or a navigation system) in the vehicle can be disposed.

The display device 100 is disposed on the dash board of the vehicle to operate as an input unit which manipulates at least a part of various functions of the vehicle. The display device 100 can provide various information related to the vehicle, for example, operation information of the vehicle (for example, a current speed of the vehicle, a remaining fuel amount, or a mileage) or information about parts of the vehicle (for example, a damage level of a vehicle tire).

The display device 100 can be disposed across the driver seat and the front passenger seat disposed in the front seats of the vehicle. A user of the display device 100 can include a driver of the vehicle and a passenger riding on the front passenger seat. Both the vehicle driver and the passenger use the display device 100.

A part of the display device 100 can be illustrated in FIG. 1. The display device 100 illustrated in FIG. 1 can illustrate a display panel, among various configurations included in the display device 100. Specifically, for example, the display device 100 illustrated in FIG. 1 can illustrate at least a part of an active area and a non-active area of the display panel. Among the configurations of the display device 100, configurations other than the parts illustrated in FIG. 1 can be mounted inside the vehicle (or at least a part of the inside of the vehicle).

Figure 2:
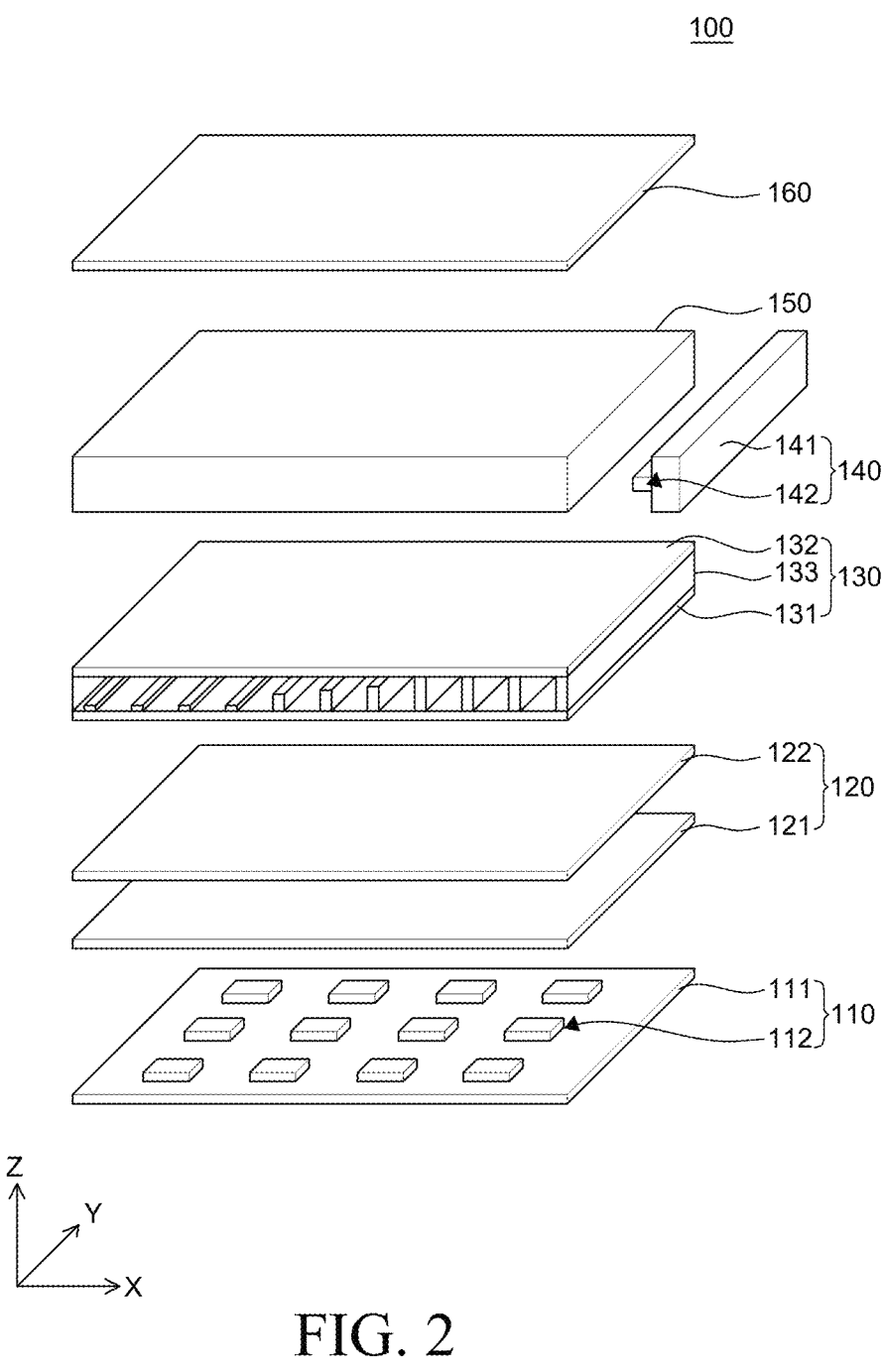
FIG. 2 is an exploded perspective view of a display device according to one or more example embodiments of the present disclosure.
Figure 3:
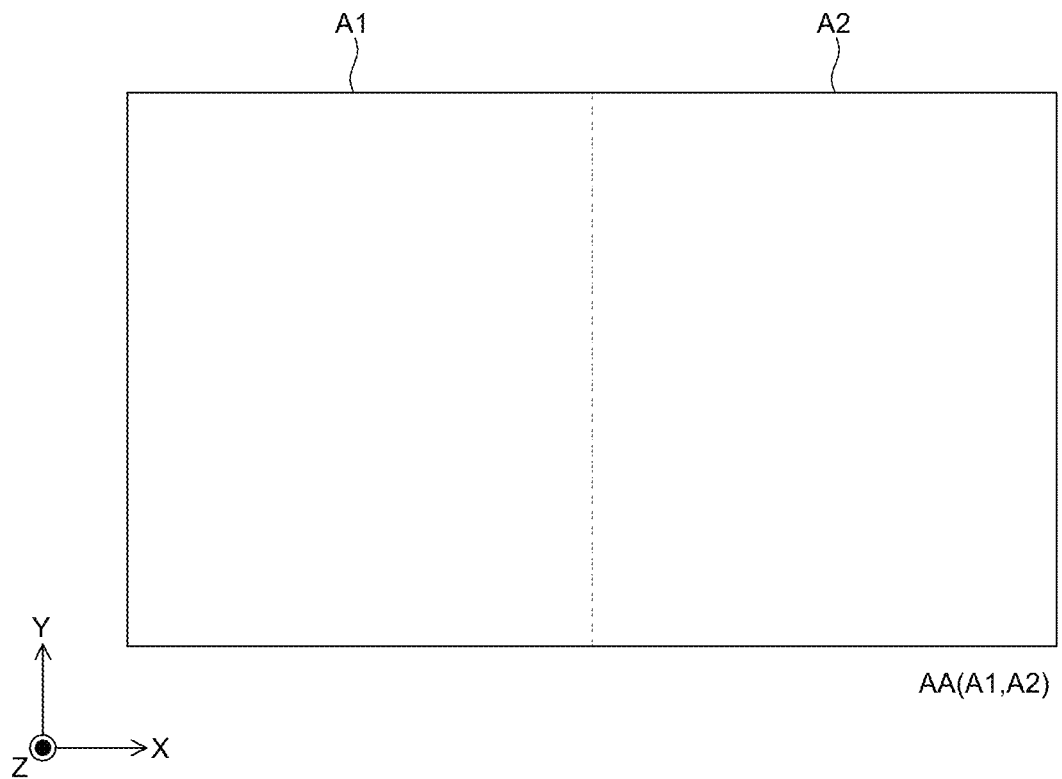
FIG. 3 is a view illustrating an example of a display panel included in a display device according to an example embodiment of the present disclosure.

FIG. 2 is an exploded perspective view of a display device according to one or more example embodiments of the present disclosure. FIG. 3 is a view illustrating an example of a display panel of a display device according to an example embodiment of the present disclosure.

In the meantime, for the convenience of description, hereinafter, a horizontal direction on the plain is illustrated as a first direction (e.g., X) and a vertical direction on the plane is illustrated as a second direction (e.g., Y). Further, a normal direction of a plane defined by the first direction X and the second direction Y, for example, a thickness direction of the display device 100 can be defined as a third direction (e.g., Z).

Referring to FIG. 2, the display device 100 according to the example embodiment of the present disclosure can include a first light source unit 110, at least one optical sheet 120, a light controller 130, a second light source unit 140, a light guide plate 150, and a display panel 160.

The display panel 160 can generate an image to be provided to a user using light provided from a light source unit disposed therebelow. For example, the display panel 160 adjusts a transmittance for light provided from the first light source unit 110 and/or the second light source unit 140 disposed therebelow to display an image.

As the display panel 160, a liquid crystal display panel can be applied. For example, the display panel 160 can include a bottom substrate, a top substrate which is opposite to the bottom substrate, and a liquid crystal layer disposed between the bottom substrate and the top substrate. Here, the liquid crystal layer can be driven by a vertical field driving method, such as a twisted nematic (TN) mode and a vertical alignment (VA) mode, or a horizontal field driving method, such as an in-plane switching (IPS) mode and a fringe field switching (FFS) mode, but is not limited thereto.

The display panel 160 can include an active area in which an image is displayed and a non-active area which encloses the active area.

The active area of the display panel 160 can be partitioned into a plurality of areas. In other words, the active area can include a plurality of areas.

For example, further referring to FIG. 3, the active area AA of the display panel 160 can include a plurality of areas disposed along the first direction X. For example, the active area AA can include a first area A1 and a second area A2 which is adjacent to the first area A1 in the first direction X. The non-active area can surround the active area AA entirely or in part(s).

According to the example embodiment, the first area A1 and the second area A2 of the display panel 160 are disposed across a driver seat and a front passenger seat disposed in front seats of the vehicle which have been described with reference to FIG. 1 to provide various information to a driver and a passenger of the vehicle. Each of the first area A1 and the second area A2 of the display panel 160 displays different information images to the user. For example, the first area A1 of the display panel 160 includes an area provided to the driver seat disposed on the front seat of the vehicle and/or an area provided between the driver seat and the front passenger seat, for example, a CID (center information display) area to provide information such as a driving speed, RPM, an engine temperature, and a fuel amount. The second area A2 of the display panel 160 is an area provided to the front passenger seat disposed on the front seat of the vehicle, for example, a CDD (complex device driver) area to provide entertainment functions and seat information for the passenger sitting in the front passenger seat. However, such area division is for the convenience of description and the first area A1 and the second area A2 in the display panel 160 can be defined in various ways depending on the design.

In the meantime, when the display panel 160 is used for the vehicle which has been described with reference to FIG. 1, a field of view of at least partial area of the display panel 160 needs to be restricted according to the user's request. For example, images displayed in the second area A2 which provides the entertainment function and the seat information for the passenger sitting on the front passenger seat can interfere with the driving of the driver. Accordingly, according to the user's request, the field of view of the image displayed in the second area A2 needs to be restricted.

For example, according to the driving mode of the display device 100, in the first mode, both the first area A1 and the second area A2 of the display panel 160 are controlled in a wide field-of-view mode (share mode) to display an image. In the second mode, at least a part of the display panel 160, for example, the second area A2 is controlled in a narrow field-of-view mode (private mode) to display an image. To this end, the display device 100 controls whether to allow the second light source unit 140 disposed on the top, among the plurality of light source units disposed below the display panel 160, to emit light to control the display panel 160 in the first mode or the second mode.

Referring to FIG. 2, a first light source unit 110, at least one optical sheet 120, a light controller 130, a second light source unit 140, and a light guide plate 150 can be disposed below the display panel 160.

The first light source unit 110 generates light and can provide the generated light to the third direction Z, for example, toward the optical sheet 120. The first light source unit 110 can be disposed below the optical sheet 120. For example, the first light source unit 110 can be a direct type backlight assembly.

The first light source unit 110 can include a first circuit board 111 and a plurality of first light sources 112 disposed on the first circuit board 111.

The first circuit board 111 can include a driving circuit which drives the plurality of first light sources 112. The driving circuit of the first circuit board 111 generates an electrical signal to drive the plurality of first light sources 112 and supplies the electrical signal to the plurality of first light sources 112. However, the present disclosure is not limited thereto and the driving circuit can be disposed at the outside of the first circuit board 111.

The plurality of first light sources 112 can be mounted on the first circuit board 111. For example, the plurality of first light sources 112 is disposed on the first circuit board 111 to be spaced apart from each other along the first direction X and the second direction Y to be mounted on a top surface which is one surface of the first circuit board 111. For example, the plurality of first light sources 112 can be disposed to be mounted on the first circuit board 111 in a matrix, but is not limited thereto.

Each of the plurality of first light sources 112 can be formed to emit white light, but is not limited thereto and the plurality of first light sources 112 can be formed to emit light with any one wavelength of red, green, and blue.

As the plurality of first light sources 112, a light emission diode (LED), a cold cathode fluorescent lamp (CCFL), or an external electrode fluorescent lamp can be used, but it is not limited thereto.

At least one optical sheet 120 can be disposed on the first light source unit 110. On the first light source unit 110, a plurality of optical sheets which diffuses or condenses light incident from the first light source unit 110 can be included.

For example, the optical sheet 120 can include a first optical sheet 121 and a second optical sheet 122. The first optical sheet 121 diffuses light provided from the first light source unit 110 and allows light to travel upwardly, for example, in the third direction Z. For example, the first optical sheet 121 can be a diffusion sheet. The second optical sheet 122 condenses light which has passed through the first optical sheet 121 to allow light to travel upwardly, for example, in the third direction Z. For example, the second optical sheet 122 can be a prism sheet.

However, the present disclosure is not limited thereto and the optical sheet 120 includes another optical sheet, in addition to the first optical sheet 121 and the second optical sheet 122. For example, the optical sheet 120 further includes a luminance improvement sheet, such as a protective sheet or a dual brightness enhancement film, or can include a composite optical sheet in which the diffusion sheet and the prism sheet are integrated, instead of the first optical sheet 121 and the second optical sheet 122.

The light controller 130 can be disposed on the optical sheet 120.

The light controller 130 can control a viewing angle of light provided from the bottom. For example, the light controller 130 can restrict a viewing angle or an emission angle in the first direction X, of light which is emitted from the first light source unit 110 to pass through the optical sheet 120 and travel in a third direction Z which is perpendicular to the active area AA. For example, the light controller 130 reduces or narrows a profile of light which is emitted from the first light source unit 110 to be incident into the light controller 130, in the first direction X. In this case, a viewing angle of an image which is displayed by the light in the first direction X can be reduced.

To this end, the light controller 130 can include a first support member 131, a second support member 132 which is opposite to the first support member 131, and a plurality of partitions 133 which is disposed between the first support member 131 and the second support member 132. In the meantime, the term, partition used in the present disclosure, is used for the convenience of description and can be defined as a term "louver" or a term "viewing angle control pattern", instead of the partition.

Each of the plurality of partitions 133 extends between the first support member 131 and the second support member 132 in the second direction Y and can be disposed to be spaced apart from each other along the first direction X.

The plurality of partitions 133 can be disposed in an area overlapping the entire active area AA, for example, in an area overlapping both the first area A1 and the second area A2. Further, the plurality of partitions 133 has a different height in each area. For example, a height of the plurality of partitions 133 can have a value which is equal to or larger than a first height which is the smallest height and is equal to or smaller than a second height which is the largest height. In the meantime, according to the present disclosure, the height can refer to a length or a distance along the thickness direction of the display device 100, and for example, along the third direction Z.

In this case, for example, a profile of light which is incident to the light controller 130, for example, an area spaced between the plurality of partitions 133, is narrowed in the first direction X, by the plurality of partitions 133 disposed to be spaced apart from each other. Most of light, which is restricted in the front direction, for example, in the third direction Z, can be provided to the display panel 160.

Accordingly, in the area in which the plurality of partitions 133 of the light controller 130 is disposed, for example, in the area in which the plurality of partitions 133 having a second height is disposed, light is provided in a first range. In the area in which even though the plurality of partitions 133 is disposed, the plurality of partitions 133 which is designed to have very small height, for example, have a first height, is disposed, and the light is provided in the second range, which is larger than the first range. Accordingly, in the case of the image which is displayed with light emitted from the first light source unit 110, in an area of the active area AA overlapping an area in which the plurality of partitions 133 of the light controller 130 is disposed, the image is displayed entirely at the second viewing angle. In an area overlapping an area in which the plurality of partitions 133 is designed to have very small height, the image can be displayed at the first viewing angle. The first viewing angle can be larger than the second viewing angle. For example, the first viewing angle can be defined as a wide viewing angle and the second viewing angle can be defined as a narrow viewing angle.

Further, the light controller 130 can control the viewing angle of the image which is displayed by light emitted from the first light source unit 110 to be different in each area. For example, the light controller 130 can control a viewing angle of light which is provided from the bottom to travel in the third direction Z in each area of the active area AA. For example, the light controller 130 can control a viewing angle of the image which is displayed by light emitted from the first light source unit 110 in the second area A2 of the active area AA.

In this case, the plurality of partitions 133 having a first height which is the smallest height can be disposed in an area overlapping the first area A1 and the plurality of partitions 133 having a second height which is the largest height can be disposed in an area overlapping the second area A2. Accordingly, in the case of the image displayed by light emitted from the first light source unit 110, in the second area A2 which overlaps an area in which the plurality of partitions 133 having the second height which is the largest height is disposed, the viewing angle is controlled to the second viewing angle to display the image. In the first area A1 which overlaps an area in which the plurality of partitions 133 having the first height which is the smallest height is disposed, the viewing angle is not controlled and the image can be displayed at the first viewing angle.

However, this is merely illustrative and the area in which the partition 133 is disposed is not limited thereto. For example, the plurality of partitions 133 is disposed only in an area which overlaps the second area A2, but is not disposed in an area which overlaps the first area A1.

The height of the plurality of partitions 133 can decrease in the direction from the second area A2 to the first area A1, for example, in the direction opposite to the first direction X. For example, the height of the plurality of partitions 133 has the first height which is the smallest height, in a first sub area which occupies the most area of the first area A1 in which the viewing angle is not substantially controlled regardless of the driving mode. The height of the plurality of partitions 133 can have the second height which is the largest height, in the second sub area which occupies the most area of the second area A2 in which the viewing angle is controlled according to the driving mode. Further, the height of the plurality of partitions 133 is gradually decreased in a direction from the second area A2 to the first area A1 in the third sub area which is an area between the first sub area and the second sub area and includes a boundary line between the first area A1 and the second area A2. Accordingly, the boundary visibility between the first area A1 and the second area A2 can be minimized.

Further, the plurality of partitions 133 can have a different width in each area. For example, a width of the plurality of partitions 133 can have a value which is equal to or larger than a first width which is the smallest width and is equal to or smaller than a second width which is the largest weight.

In the meantime, according to the present disclosure, the weight can refer to a length or a distance along the horizontal axis direction of the display device 100 which is perpendicular to the extending direction of the partition 133, and for example, in the first direction X.

Specifically, the larger the width of the partition 133, the smaller the transmittance of light in the area in which the partition 133 is disposed. In an area of the area on the light controller 130 overlapping the first area A1 in which the image is displayed at the first viewing angle, which is a wide viewing angle, regardless of the driving mode, it is necessary to ensure an emission angle which is larger than an emission angle in an area which overlaps the second area A2.

Accordingly, the plurality of partitions 133 having the first width which is the smallest width on an area overlapping the first area A1 is disposed in an area overlapping the first area A1 and a plurality of partitions 133 having a second width which is the largest width can be disposed to overlap the second area A2. Accordingly, in the case of the image which is displayed by light emitted from the first light source unit 110, in the first area A1 which overlaps an area in which the plurality of partitions 133 having the first width which is the smallest width is disposed, a predetermined transmittance is ensured to emit light according to an emission angle requested for the first area A1 to display an image at a first viewing angle. In the second area A2 which overlaps an area in which the plurality of partitions 133 having the second width which is the largest width is disposed, light is emitted at an emission angle which is smaller than that in the first area A1 by a transmittance which is smaller than that in the first area A1 so that the viewing angle is controlled to the second viewing angle to display an image.

Further, the width of the plurality of partitions 133 can decrease in the direction from the second area A2 to the first area A1, for example, in the opposite direction to the first direction X. For example, the width of the plurality of partitions 133 has the first width which is the smallest width, in a first sub area which occupies the most area of the first area A1 in which the viewing angle is not substantially controlled regardless of the driving mode. The width of the plurality of partitions 133 has the second width which is the largest width, in the second sub area which occupies the most area of the second area A2 in which the viewing angle is controlled according to the driving mode. Further, the width of the plurality of partitions 133 can be gradually decreased in a direction from the second area A2 to the first area A1 in the third sub area which is an area between the first sub area and the second sub area and includes a boundary line between the first area A1 and the second area A2. Accordingly, the boundary visibility between the first area A1 and the second area A2 can be minimized or reduced.

A height for each area of the plurality of partitions 133 and a width for each area will be described in detail below with reference to FIGS. 4 to 10.

The second light source unit 140 and the light guide plate 150 can be disposed on the light controller 130.

The second light source unit 140 generates light and can provide the generated light to the light guide plate 150. The second light source unit 140 can be disposed on a side surface of the light guide plate 150. For example, the second light source unit 140 can be an edge type backlight assembly.

The second light source unit 140 can include a second circuit board 141 and a plurality of second light sources 142 disposed on the second circuit board 141.

The second circuit board 141 can include a driving circuit which drives the plurality of second light sources 142. The driving circuit of the second circuit board 141 generates an electrical signal to drive the plurality of second light sources 142 and can supply the electrical signal to the plurality of second light sources 142. However, the present disclosure is not limited thereto and the driving circuit can be disposed at the outside of the second circuit board 141.

The second circuit board 141 can be disposed on a side surface of the light guide plate 150. For example, the second circuit board 141 can be disposed to be parallel to the light guide plate 150. For example, the second circuit board 141 can have a shape which corresponds to one short side of the light guide plate 150 to extend along a length direction of the short side, for example, along the second direction Y. However, the present disclosure is not limited thereto and the second circuit board 141 can be disposed so as to correspond to one long side of the light guide plate 150.

Further, the plurality of second light sources 142 can be mounted on the second circuit board 141. For example, the plurality of second light sources 142 is disposed on the second circuit board 141 to be spaced apart from each other along the second direction Y to be mounted on a top surface which is one surface of the second circuit board 141.

Each of the plurality of second light sources 142 can be formed to emit white light, but is not limited thereto and the plurality of second light sources 142 can be formed to emit light with any one wavelength of red, green, and blue.

As the plurality of second light sources 142, a light emission diode (LED), a cold cathode fluorescent lamp (CCFL), or an external electrode fluorescent lamp can be used, but it is not limited thereto.

The light guide plate 150 is disposed on the light controller 130 and can be disposed on a side portion of the second light source unit 140. For example, the light guide plate 150 can be disposed on the substantially same plane as the second light source unit 140.

The light guide plate 150 can be formed of a material including glass, quartz, or polymer having transparency, to efficiently guide the light. For example, the polymer can be formed of a material having a predetermined refractive index, such as acrylic resin including polymethylmethacrylate (PMMS) or polycarbonate (PC).

The light guide plate 150 guides light provided from the second light source unit 140 to allow the light to travel in a direction toward the display panel 160, for example, in the third direction Z. For example, light which is incident from the second light source unit 140, through a side surface on which the second light source unit 140 is disposed, changes the traveling direction to the third direction Z toward the display panel 160, by total reflection, while traveling in the light guide plate 150. Therefore, a uniform surface light source can be provided in the display panel 160.

Further, the light which is provided via the optical sheet 120 and the light controller 130 from the first light source unit 110 can travel to the third direction Z which is a direction toward the display panel 160 by means of the light guide plate 150.

In the meantime, as described above, the driving mode of the display device 100 can be controlled depending on whether the second light source 142 included in the second light source unit 140 emits light.

For example, in the first mode, all the plurality of first light sources 112 of the first light source unit 110 and the plurality of second light sources 142 of the second light source unit 140 can emit light. In this case, even though in at least a partial area of the active area AA, for example, in an area overlapping the second area A2, a viewing angle of light emitted from the first light source unit 110 is controlled by the light controller 130, light emitted from the second light source unit 140 travels by the light guide plate 150 in the third direction Z which is a direction toward the display panel 160 to be provided in the entire active area AA. Therefore, the image can be displayed at the first viewing angle in the entire area of the display panel 160. Accordingly, in the first mode, the image can be displayed in a wide field-of-view mode (share mode) in the entire active area AA, for example, in both the first area A1 and the second area A2.

Further, in the second mode, the plurality of first light sources 112 of the first light source unit 110 emits light and the plurality of second light sources 142 of the second light source unit 140 does not emit light. Therefore, an image which is displayed by the display panel 160 in the second mode can be implemented only by light provided from the first light source unit 110. In this case, in an area of the active area AA which overlaps the second area A2, the viewing angle of the light emitted from the first light source unit 110 is controlled by the light controller 130. Therefore, in the first area A1 of the display panel 160, the image is displayed at the first viewing angle and in the second area A2 of the display panel 160, the image can be displayed at the second viewing angle. Accordingly, in the second mode, the image is displayed in the wide field-of-view mode (share mode) in the first area A1 of the active area AA and the image can be displayed in the narrow field-of-view mode (private mode) in the second area A2 of the active area AA.

As described above, the display device 100 according to the example embodiment of the present disclosure controls the second light source unit 140 disposed on the top, among the plurality of light source units disposed below the display panel 160, for example, the first light source unit 110 and the second light source unit 140 to emit light. By doing this, the display device can control the display panel 160 in the first mode or the second mode.

Hereinafter, the light controller 130 of the display device 100 according to the example embodiment of the present disclosure will be described in more detail with reference to FIGS. 4 to 10.

Figure 4:
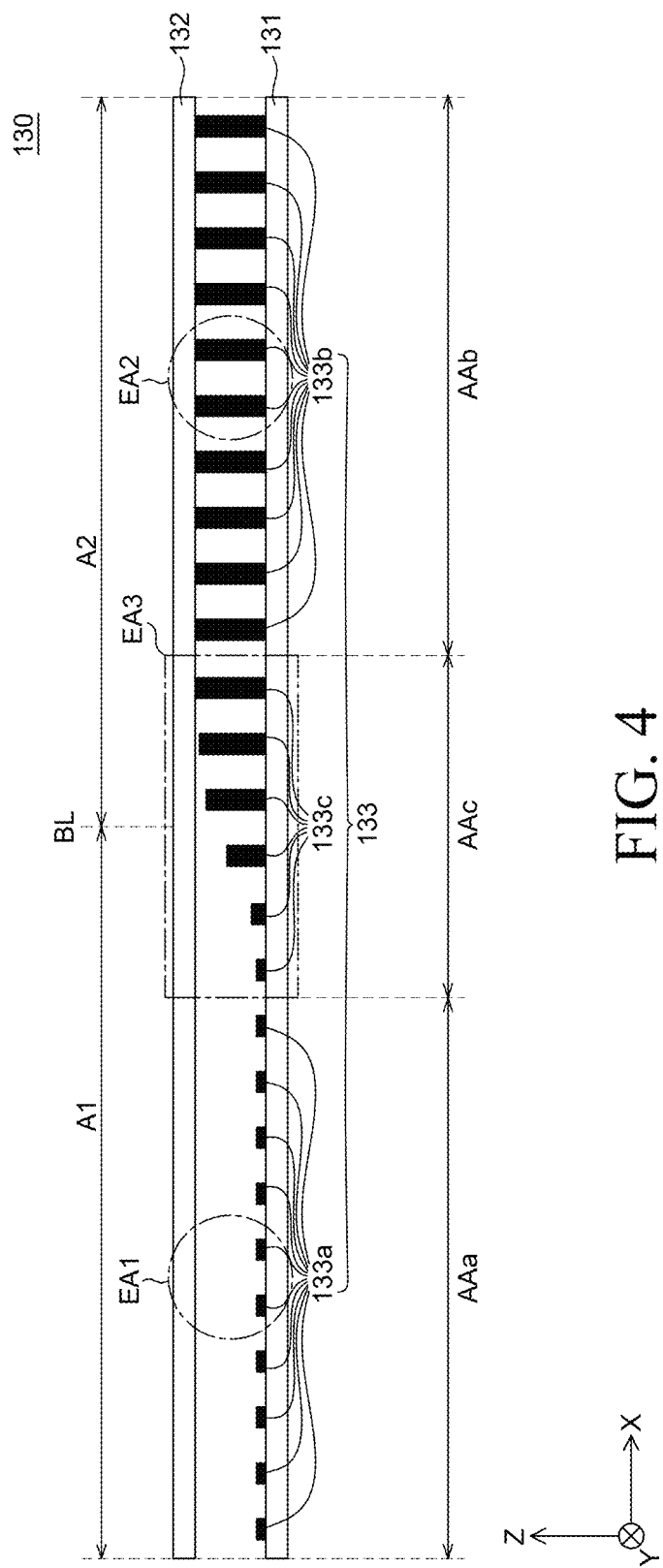
FIG. 4 is a side view schematically illustrating an example of a light controller included in the display device of FIG. 2.
Figure 5A:
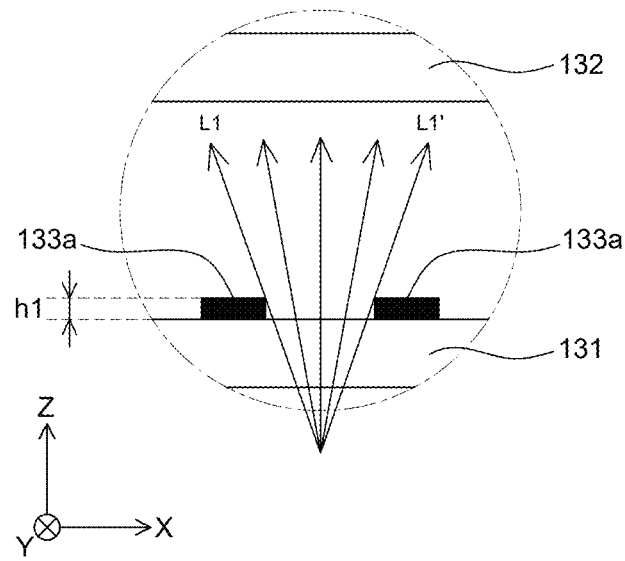
FIG. 5A is an enlarged view illustrating an example of a part EA1 of FIG. 4.
Figure 5B:
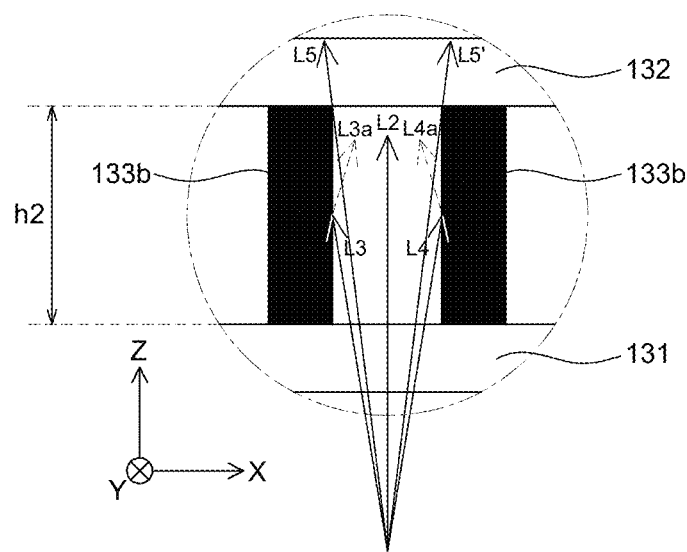
FIG. 5B is an enlarged view illustrating an example of a part EA2 of FIG. 4.
Figure 5C:
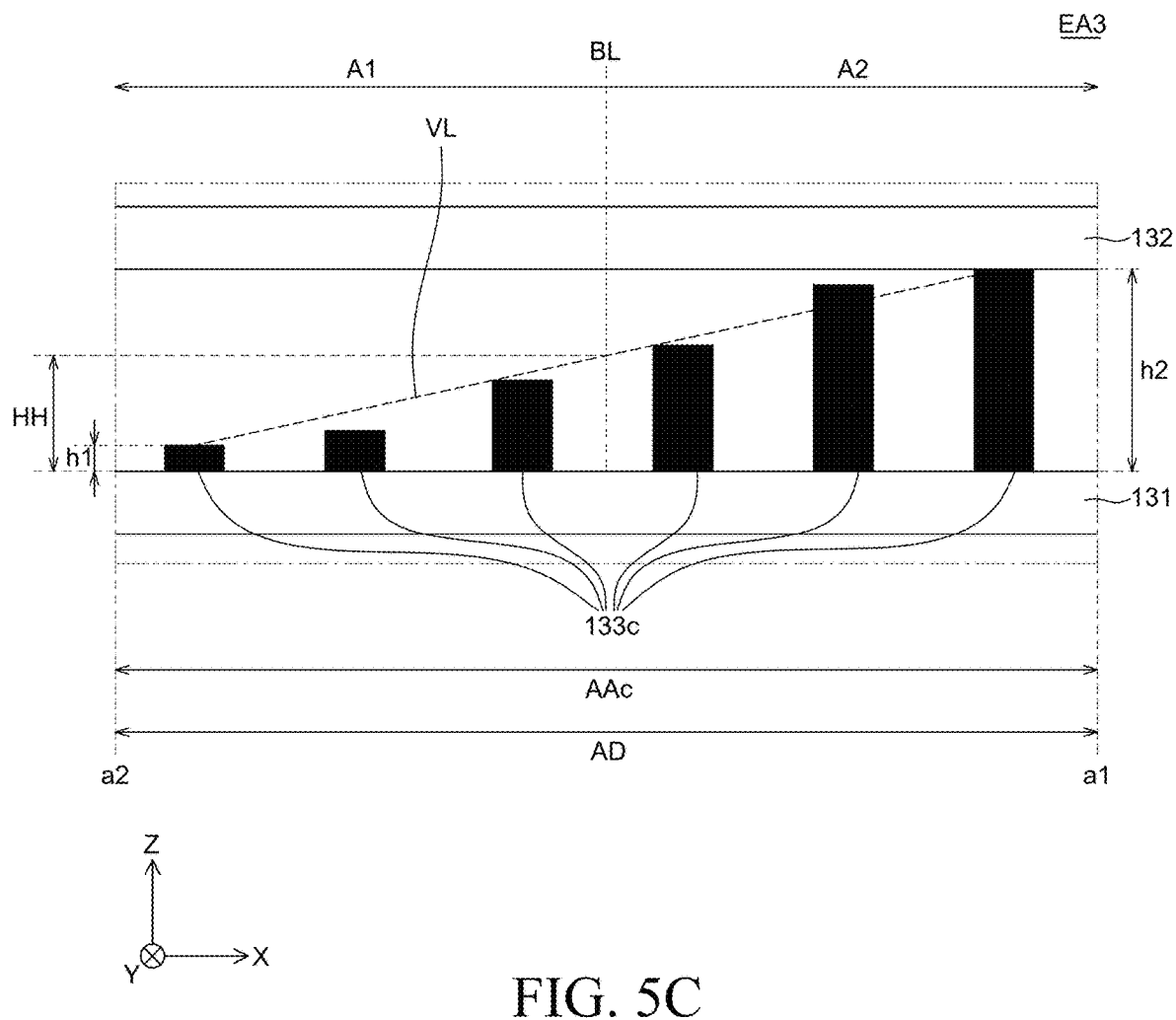
FIG. 5C is an enlarged view illustrating an example of a part EA3 of FIG. 4.

FIG. 4 is a side view schematically illustrating an example of a light controller included in the display device of FIG. 2. FIG. 5A is an enlarged view illustrating an example of a part EA1 of FIG. 4. FIG. 5B is an enlarged view illustrating an example of a part EA2 of FIG. 4. FIG. 5C is an enlarged view illustrating an example of a part EA3 of FIG. 4.

In the meantime, the light controller 130 illustrated in FIG. 4 represents an example of the light controller 130 included in the display device 100 which has been described with reference to FIG. 2.

Referring to FIGS. 2 and 4, the light controller 130 includes a first support member 131, a second support member 132 which is opposite to the first support member 131, and a plurality of partitions 133 disposed between the first support member 131 and the second support member 132. By doing this, the light controller can control a viewing angle or an emission angle according to the first direction X of light which travels toward the third direction Z which is perpendicular to the active area AA.

The first support member 131 and the second support member 132 can be disposed to be spaced apart from each other with the partition 133 therebetween. The first support member 131 is disposed below the plurality of partitions 133 to support the plurality of partitions 133 and the second support member 132 is disposed above the plurality of partitions 133 to support the plurality of partitions 133. However, the disclosure is not limited thereto and bottom surfaces of the plurality of partitions 133 are in contact with the first support member 131 and top surfaces of the plurality of partitions 133 can be spaced apart from the second support member 132.

The first support member 131 and the second support member 132 include transparent material to allow light to pass therethrough. For example, each of the first support member 131 and the second support member 132 includes a plastic member. For example, each of the first support member 131 and the second support member 132 can include polycarbonate. However, the material of each of the first support member 131 and the second support member 132 is not limited thereto. According to the example embodiment, each of the first support member 131 and the second support member 132 can include polymer, such as polystyrene, polyvinyl alcohol, polymethyl methacrylate, polyethersulfone, polyacrylate, polyetherimide, polyethylene naphthalate, polyethylene terephthalate, polyphenylene sulfide, polyarylate, or polyimide.

The plurality of partitions 133 can be disposed between the first support member 131 and the second support member 132. In the meantime, each of the plurality of partitions 133 can be coupled to the first support member 131 and the second support member 132 by means of a transparent adhesive, but is not limited thereto.

Each of the plurality of partitions 133 extends along the second direction Y and can be disposed to be spaced apart from each other along the first direction X. Accordingly, a space can be formed between the plurality of partitions 133. Such a space can be filled with air or a transparent insulating material, but is not limited thereto.

In the meantime, an interval along the first direction X, between two adjacent partitions 133, among the plurality of partitions 133, is determined by comprehensively considering a thickness of the light controller 130, an emission angle of light emitted from the light controller 130, and a distance between the light controller 130 and the display panel 160. By doing this, the image displayed by the light provided from the first light source unit 110 is displayed on the second area A2 at the second viewing angle.

According to the example embodiment, a width of the interval along the first direction X between two adjacent partitions 133, among the plurality of partitions 133, can have a fixed value, but is not limited thereto.

Each of the plurality of partitions 133 can include a light absorption material or can be coated with a light absorbing agent to absorb light entering from the outside. For example, each of the plurality of partitions 133 can include a carbon based black pigment. However, a material of the plurality of partitions is not limited thereto. Each of the plurality of partitions 133 includes at least one of titanium (Ti), tungsten (W), chromium (Cr), molybdenum (Mo), an alloy of molybdenum (Mo) and titanium (Ti) (MoTi), vanadium (V), niobium (Nb), silicon nitride (SiN), titanium nitride (TiN), silicon carbide (SiC), tantalum (Ta), manganese (Mn), cobalt (Co), nickel (Ni), copper oxide (CuO), aluminum oxide (Al2O3), iron oxide (Fe3O4), and tantalum oxide (Ta2O5) having a high light absorptance or includes an organic material having a high light absorptance.

Further, each of the plurality of partitions 133 can have the shape of a square pillar. For example, the plurality of partitions 133 can have a shape of square pillar in which both side surfaces opposing along the second direction Y are rectangular. Therefore, each of the plurality of partitions 133 can have a rectangular shape as seen from a plane defined by the first direction X and the third direction Z. Therefore, a top surface and a bottom surface of each of the plurality of partitions 133 are parallel to the first support member 131 and the second support member 132. Both side surfaces of the plurality of partitions 133 which are opposite to each other along the first direction X can be perpendicular to the first support member 131 and the second support member 132. For example, both side surfaces of the plurality of partitions 133 which are opposite to each other along the first direction X can be parallel to the third direction Z which is perpendicular to the first support member 131 and the second support member 132.

However, the shape of the plurality of partitions 133 is not limited thereto and the plurality of partitions 133 can have various shapes. For example, the plurality of partitions 133 can have the shape of a square pillar with both side surfaces which are opposite to each other along the second direction Y in a shape of a trapezoid, an isosceles trapezoid, or other square. In the meantime, referring to FIG. 4, the active area AA can be divided into a plurality of sub areas AAa, AAb, AAc. For example, the active area AA can be divided into a first sub area AAa, a second sub area AAb, and a third sub area AAc. Here, the first sub area AAa corresponds to a partial area of the first area A1, the second sub area AAb corresponds to a partial area of the second area A2, and the third sub area AAc is an area which is disposed between the first sub area AAa and the second sub area AAb and includes a boundary line BL between the first sub area AAa and the second sub area AAb. The third sub area can be defined as an area including an area excluding the first sub area AAa from the first area A1 and an area excluding the second sub area AAb from the second area A2.

The plurality of partitions 133 can be disposed on the entire active area AA. For example, the plurality of partitions 133 can include a plurality of first partitions 133*a* disposed on the first sub area AAa, a plurality of second partitions 133*b* disposed on the second sub area AAb, and a plurality of third partitions 133*c* disposed on the third sub area AAc.

The plurality of first partitions 133*a* can be disposed between the first support member 131 and the second support member 132 on the first sub area AAa. For example, each of the plurality of first partitions 133*a* extends along the second direction Y and can be disposed to be spaced apart from each other along the first direction X. Accordingly, a space can be formed between the plurality of first partitions 133*a*.

The plurality of second partitions 133*b* can be disposed between the first support member 131 and the second support member 132 on the second sub area AAb. For example, each of the plurality of second partitions 133*b* extends along the second direction Y and can be disposed to be spaced apart from each other along the first direction X. Accordingly, a space can be formed between the plurality of second partitions 133*b*.

The plurality of third partitions 133c can be disposed between the first support member 131 and the second support member 132 on the third sub area AAc. For example, each of the plurality of third partitions 133c extends along the second direction Y and can be disposed to be spaced apart from each other along the first direction X. Accordingly, a space can be formed between the plurality of third partitions 133c.

The plurality of partitions 133 can have a different height in each area. As described above, an emission angle of light emitted from the light controller 130 in the first direction X can be restricted for each area by the plurality of partitions 133 having different heights in each area.

In the meantime, according to the present disclosure, an emission angle can refer to an angle formed by a traveling direction of light emitted from the light controller 130 and the third direction Z, on the side surface, for example, on the plane defined by the first direction X and the third direction Z.

To be more specific, a height of the first partition 133a can be different from a height of the second partition 133b. For example, the height of the first partition 133a is smaller than the height of the second partition 133b. For example, the first partition 133a disposed on the first sub area AAa has a first height and the second partition 133b disposed on the second sub area AAb can have a second height.

For example, further referring to FIG. 5A, the first partition 133a has a first height h1. Here, the first height h1 can correspond to a minimum height which is available by the process.

As described above, the plurality of first partitions 133a has a very small height so that an emission angle of light which is incident to a most area of the first area A1, for example, the first sub area AAa, may not be substantially restricted. For example, as illustrated in FIG. 5A, the first height h1 of the plurality of first partitions 133a has a very small value so that upper ends of two first partitions 133a which are spaced apart from each other can be located to be adjacent to a top surface of the first support member 131. In this case, a traveling path of most of light provided from the bottom of the light controller 130 is formed between light which passes through upper end insides of two first partitions 133a which are spaced apart from each other, for example, formed between first light L1 and first' light L1'. Therefore, most of light provided from the bottom of the light controller 130 can be emitted upwardly from the light controller 130.

Accordingly, in the first sub area AAa in which the plurality of first partitions 133a is disposed, an emission angle of light provided from the bottom of the light controller 130, for example, light provided from the first light source unit 110 is not substantially restricted. Therefore, the light can be provided in a second range which is larger than a first range.

Further, further referring to FIG. 5B, the second partition 133b can have a second height h2 which is larger than the first height h1. Here, the second height h2 can be substantially the same as a length of a space between the first support member 131 and the second support member 132 along the third direction Z. However, the disclosure is not limited thereto and the second height h2 of each of the plurality of second partitions 133b can be smaller than a length of the space between the first support member 131 and the second support member 132 along the third direction Z.

As described above, an emission angle of light emitted from the light controller 130 in the first direction X can be restricted by the plurality of second partitions 133b having a second height h2, in the second sub area AAb. For example, light provided from the bottom of the light controller 130, for example, light provided from the first light source unit 110 has a light profile which is reduced or narrowed by the plurality of second partitions 133b along the first direction X. Accordingly, in the second sub area AAb in which the second partition 133b is disposed, the emission angle of light in the first direction X can be restricted.

For example, referring to FIG. 5B, among light provided from the bottom of the light controller 130, second light L2 having a light path formed in the third direction Z which is a vertical direction, between two partitions 133 is not blocked by the second partition 133b, but can be emitted to the outside, for example, the upward direction of the light controller 130.

Further, among light provided from the bottom of the light controller 130, light which passes through the upper end inside of two separated second partitions 133b, for example, light between fifth light L5 and fifth' light L5' can be emitted to an upward direction of the light controller 130.

However, when a light path is formed at a predetermined angle with respect to the first direction X between two separated second partitions 133b and the second partition 133b is located on the light path, among light provided from the bottom of the light controller 130, at least some of light can be blocked by the second partition 133b. For example, light provided from the bottom of the light controller 130 at an angle larger than an incident angle of the fifth light L5 and the fifth' light L5' is blocked by the plurality of second partitions 133b so as not to be emitted to an upward direction of the light controller 130. For example, at least some of third light L3 and fourth light L4 provided from the bottom of the light controller 130 is absorbed by the second partition 133b and is not emitted to the outside.

In the meantime, in the case of light with a light path on which the second partition 133b is located, each of the plurality of second partitions 133b includes a light absorption material or is coated with the light absorption agent so that most light is absorbed by the second partition 133b. However, the remaining light which is not absorbed by the second partition 133b is totally reflected from the second partition 133b to be emitted to the outside. For example, the third light L3a which is not absorbed by the second partition 133b, among the third light L3 and fourth light L4a which is not absorbed by the second partition 133b, among fourth light L4, are totally reflected from the second partition 133b to be emitted to the outside.

Accordingly, in the second sub area AAb in which the plurality of second partitions 133b is disposed, an emission angle of light provided from the bottom of the light controller 130, for example, light provided from the first light source unit 110 is restricted. Therefore, the light can be provided in the first range which is smaller than the second range.

As described above, in the second area A2 in which the plurality of second partitions 133b having a second height h2 in the most area, for example, in the second sub area AAb is disposed, an emission angle of light in the first direction X is restricted to provide light in the first range. In the first area A1 in which the plurality of first partitions 133a having a first height h1 in the most area, for example, in the first sub area AAa is disposed, an emission angle of light in the first direction X is not restricted to provide light in the second range which is larger than first range. Accordingly, in the case of an image which is displayed by light emitted from the first light source unit 110 disposed below the light controller 130, in the second area A2 of the active area AA, the image is entirely displayed at the second viewing angle, for example, at a narrow viewing angle and in the first area A1, the image can be entirely displayed at the first viewing angle, for example, at a wide viewing angle.

Further, referring to FIGS. 4 and 5C, the plurality of third partitions 133c can have a height which is equal to or larger than the first height h1 and is equal to or smaller than the second height h2. For example, the third height of the plurality of third partitions 133c is gradually increased toward the first direction X. For example, the third height of the plurality of third partitions 133c can be gradually increased from the first area A1 to the second area A2, or from the first sub area AAa to the second sub area AAb. For example, a third partition 133c, among the plurality of third partitions 133c, which is the most adjacent to the first sub area AAa has the first height h1 which is the same as or similar to the first partition 133a. A third partition 133c, among the plurality of third partitions 133c, which is the most adjacent to the second sub area AAb has the second height h2 which is the same as or similar to the second partition 133b. The remaining third partition 133c, among the plurality of third partitions 133c, has a height between the first height h1 and the second height h2 and the third height can be increased toward the first direction X.

In other words, from the vicinity of the boundary line BL between the first area A1 and the second area A2, the third height of the plurality of third partitions 133c can be gradually increased toward the first direction X, for example, a direction directed to the second sub area AAb or the second area A2. Accordingly, in the case of the image which is displayed by light, which is incident to the light controller 130, a boundary visibility according to a viewing angle difference of the first area A1 and the second area A2 can be minimized or reduced in the boundary portion between the second area A2 and the first area A1. In the second area A2, a viewing angle is entirely restricted to display an image at a second viewing angle, for example, a narrow viewing angle and in the first area A1, the viewing angle is not substantially restricted to display an image at a first viewing angle, for example, a wide viewing angle.

Further, a change rate of the third height of the third partition 133c, for example, an increase rate of the third height of the third partition 133c along the first direction X or a decrease rate of the third height of the third partition 133c along an opposite direction to the first direction X can be different in each area.

For example, the closer to the center portion of the third sub area AAc, for example, the boundary line BL, the larger the change rate of the third height of the third partition 133c and the closer to the first sub area AAa and the second sub area AAb, the smaller the change rate of the third height. In this case, as illustrated in FIG. 5C, the third height of the third partition 133c is gently changed in an area relatively adjacent to the first sub area AAa and the second sub area AAb. Further, the third height of the third partition 133c is sharply changed in an area which is relatively far from the first sub area AAa and the second sub area AAb, for example, in the vicinity of the boundary line BL.

As described above, in an area adjacent to the second sub area AAb in which a viewing angle or an emission angle of light incident from the bottom of the light controller 130 is controlled and an area adjacent to the first sub area AAa in which a viewing angle or an emission angle of the light is not substantially controlled, the third height of the third partition 133c is gently changed. Therefore, the boundary visibility in the boundary portion between the first area A1 and the second area A2 is more effectively improved.

Further, referring to FIG. 5C, a distance between a first position a1 which is a boundary between the second sub area AAb and the third sub area AAc, and a second position a2 which is a boundary between the first sub area AAa and the third sub area AAc, for example, the area width AD of the third sub area AAc is determined by comprehensively considering a distance between the first light source unit 110 and the light controller 130, a thickness of the light controller 130, and an interval between the partitions 133, so that the boundary between the first area A1 and the second area A2 is not visible.

In the meantime, the boundary between the first area A1 and the second area A2 of the active area AA can be defined in the third sub area AAc. In order to describe in more detail, further referring to FIG. 5C, based on a point where on a virtual line VL connecting a center point of a top surface of the third partition 133c which is the most adjacent to the second sub area AAb, among the plurality of third partitions 133c, and a center point of a top surface of the third partition 133c which is the most adjacent to the first sub area AAa, among the plurality of third partitions 133c, a height from the first support member 131 has a height HH which is half the second height h2 which is a height of the second partition 133b disposed on the second area A2, a straight line parallel to the third direction Z can be defined as a boundary line BL between the first area A1 and the second area A2. However, it is merely illustrative to divide the first area A1 and the second area A2 in the active area AA along the boundary line BL and the first area A1 and the second area A2 in the active area AA can be defined in various ways depending on the design. For example, depending on the design, a straight line parallel to the third direction Z based on a point having a height equal to ⅔ of the second height h2 on the above-described virtual line VL can be defined as the boundary line BL between the first area A1 and the second area A2.

As described above, in the case of an image displayed by light provided from the bottom of the light controller 130, for example, the first light source unit 110, a plurality of second partitions 133b having a second height h2 is disposed on the most area of the second area A2, for example, on the second sub area AAb, so that in the second area A2, the viewing angle is controlled to the second viewing angle to display the image. Further, for example, a plurality of first partitions 133a having a first height h1 which is smaller than the second height h2 is disposed on the most area of the first area A1, for example, on the first sub area AAa, so that in the first area A1, the viewing angle is not substantially controlled to display the image at the first viewing angle.

Further, a third height of the plurality of third partitions 133c disposed in an area in the vicinity of the boundary line BL between the first area A1 and the second area A2 in which the viewing angle is controlled to be different according to the driving mode, for example, in the third sub area AAc is designed to be equal to or larger than the first height h1 or equal to or smaller than the second height h2 and to be gradually changed toward one direction. Therefore, the boundary visibility between the first area A1 and the second area A2 can be minimized or reduced.

Specifically, the closer to the center portion of the third sub area AAc, for example, the boundary line BL, the larger the change rate of the third height of the third partition 133c and the closer to the first sub area AAa and the second sub area AAb, the smaller the change rate. Accordingly, the boundary visibility between the first area A1 and the second area A2 can be more effectively improved.

Further, during the manufacturing process of the light controller 130, the plurality of partitions 133 is not only formed in the second area A2 for controlling the viewing angle, but also formed in the entire active area AA so that the manufacturing process of the light controller 130 can be more simplified.

Figure 6:
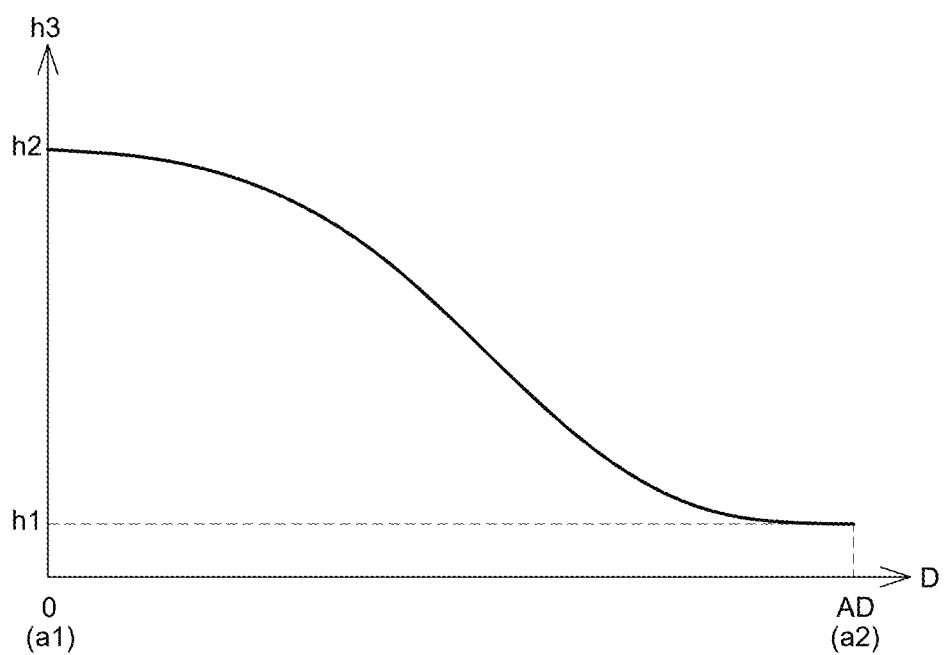
FIG. 6 is a graph for explaining an example of a height of a third partition included in the light controller of FIG. 4.

FIG. 6 is a graph for explaining an example of a height of a third partition included in a light controller of FIG. 4.

Particularly, FIG. 6 illustrates a graph of a third height h3 of the third partition 133c with respect to the distance D according to an opposite direction to the first direction X which is a direction of the first sub area AAa, with respect to the boundary of the second sub area AAb and the third sub area AAc, for example, a first position a1 illustrated in FIG. 5C.

Referring to FIGS. 4, 5C, and 6, the third height h3 of the third partition 133c can be reduced toward an opposite direction to the first direction X, for example, toward a direction from the second area A2 to the first area A1. For example, the third height h3 of the third partition 133c can be reduced from the first position a1 which is the boundary between the second sub area AAb and the third sub area AAc to the second position a2 which is the boundary between the first sub area AAa and the third sub area AAc.

Further, a change rate of the third height h3 of the third partition 133c can be different in each area. Further, a change rate of the third height h3 of the third partition 133c is an absolute value of the slope of the tangent line of the graph illustrated in FIG. 6, and can refer to an increase rate of the third height h3 of the third partition 133c along the first direction X or a decrease rate of the third height h3 of the third partition 133c along an opposite direction to the first direction X. For example, the closer to the first position a1 and/or the second position a2, the smaller the change rate of the third height h3 of the third partition 133c and the farther from the first position a1 and the second position a2, for example, the closer to the boundary line BL between the first area A1 and the second area A2 as a center portion of the third sub area AAc, the larger the change rate. For example, the change rate of the third height h3 of the third partition 133c has the same or substantially same value in the first position a1 and the second position a2, for example, has a minimum value. Accordingly, as described above, the third height h3 of the third partition 133c is gently changed in an area relatively adjacent to the first sub area AAa and the second sub area AAb. Further, the third height h3 of the third partition 133c can be sharply changed in an area which is relatively far from the first sub area AAa and the second sub area AAb, for example, in the vicinity of the boundary line BL.

To be more specific, a value of the third height h3 of the third partition 133c can have a value obtained by applying a trigonometric function to the distance D from the first position a1. For example, the value of the third height h3 of the third partition 133c can have a value obtained by applying a cosine or sine function to the distance D from the first position a1.

For example, the third height h3 of the third partition 133c can be calculated by the following Equation 1.

$$h3 = \frac{h2 + h1}{2} + \left(\frac{h2 - h1}{2}\right) \cdot \cos\left(\frac{D\pi}{AD}\right) \quad \text{[Equation 1]}$$

In Equation 1, h3 is a third height h3 of the third partition 133c, h1 is a first height h1 of the first partition 133a, h2 is a second height h2 of the second partition 133b, D is a distance D along an opposite direction to the first direction X from the first position a1, and AD is an area width AD of the third sub area AAc.

In Equation 1, D is a distance D along an opposite direction to the first direction X from the first position a1 and is defined in the third sub area AAc. As illustrated in FIG. 6, a value of D has 0 when the position is the first position a1 and has a value of an area width AD of the third sub area AAc when the position is the second position a2. For example, D can have a value which is equal to or larger than 0 or is equal to and smaller than AD.

Equation 1 will be described in more detail. With respect to the "cos(Dπ/AD)" term, since D has a value equal to or larger than 0 and equal to or smaller than AD as described above, when the corresponding position is between the first position a1 and the second position a2 within the third sub area AAc, the value of the "Dπ/AD" term has a value equal to or larger than 0 and equal to or smaller than π. Accordingly, the value of the "cos(Dπ/AD)" term has a value equal to or larger than −1 and equal to or smaller than 1, and can decrease from the first position a1 to the second position a2. For example, a value of the "cos(Dπ/AD)" term is 1 in the first position a1 and −1 in the second position a2. Here, according to the property of the trigonometric function, for example, the cosine function, the value of the "cos(Dπ/AD)" term can gently decrease in the first position a1 and the second position a2, for example, decrease at a decrease rate with a relatively small value.

Further, the "cos(Dπ/AD)" term has a value which is equal to or larger than −1 and equal to or smaller than 1, so that according to Equation 1, as illustrated in FIG. 6, a value of the third height h3 of the third partition 133c has a value which is equal to or larger than the first height h1 and equal to or smaller than the second height h2 and can decrease from the first position a1 to the second position a2. For example, according to the change rate of the value of the "cos(Dπ/AD)" term according to the position, the value of the third height h3 of the third partition 133c gently decreases in the first position a1 and the second position a2, for example, decreases with a minimum decrease rate or change rate. Further, the value of the third height h3 of the third partition 133c can decrease in the boundary line BL between the first area A1 and the second area A2, for example, in an intermediate point of the first position a1 and the second position a2, with a maximum decrease rate or change rate.

As described above, in the third sub area AAc in which the plurality of third partitions 133c with a height which varies according to the position is disposed, as an area including the boundary line BL of the first area A1 and the second area A2, the third height h3 of the third partition 133c disposed on the third sub area AAc is gently changed in an area adjacent to the second sub area AAb in which a viewing angle or an emission angle of light incident from the bottom of the light controller 130 is controlled and an area adjacent to the first sub area AAa in which the viewing angle or the emission angle of the light is not substantially controlled. Accordingly, the boundary visibility in the boundary portion between the first area A1 and the second area A2 can be more effectively improved.

Figure 7:
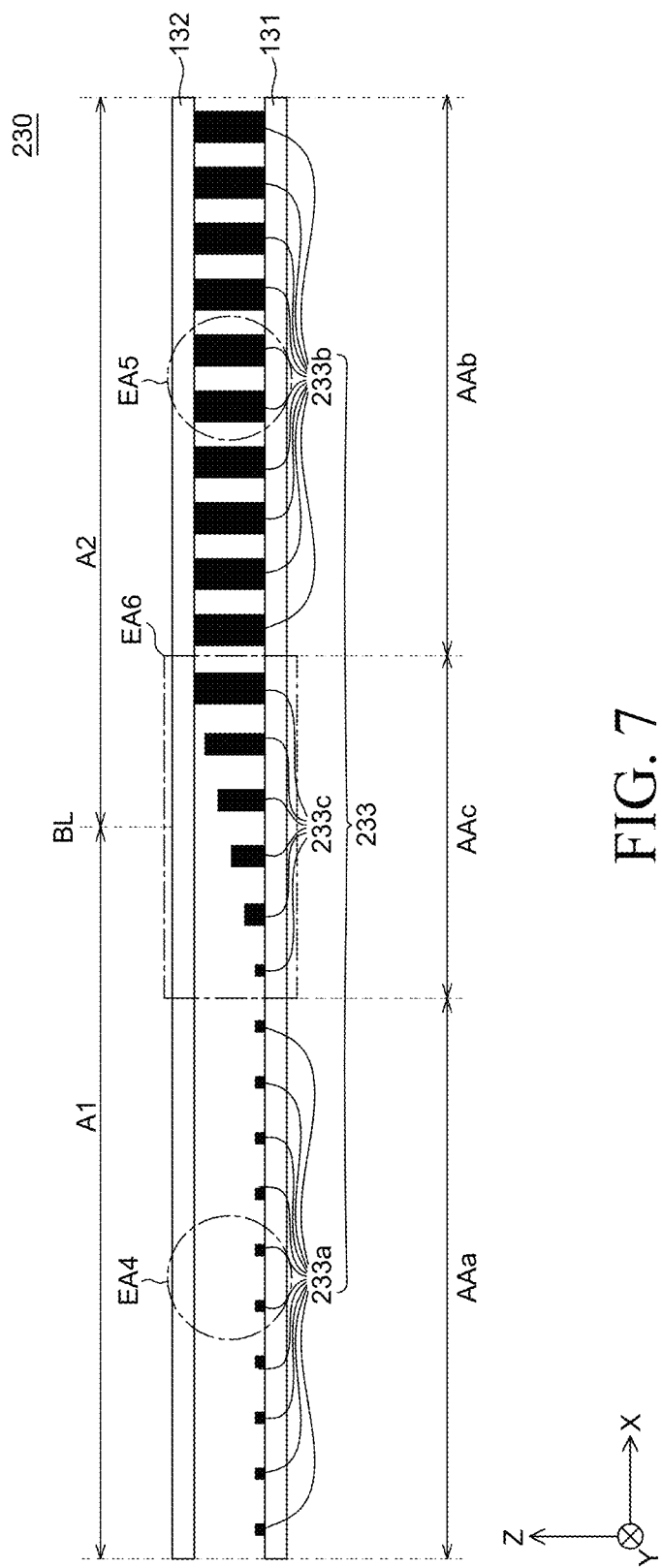
FIG. 7 is a side view schematically illustrating another example of a light controller included in the display device of FIG. 2.
Figure 8A:
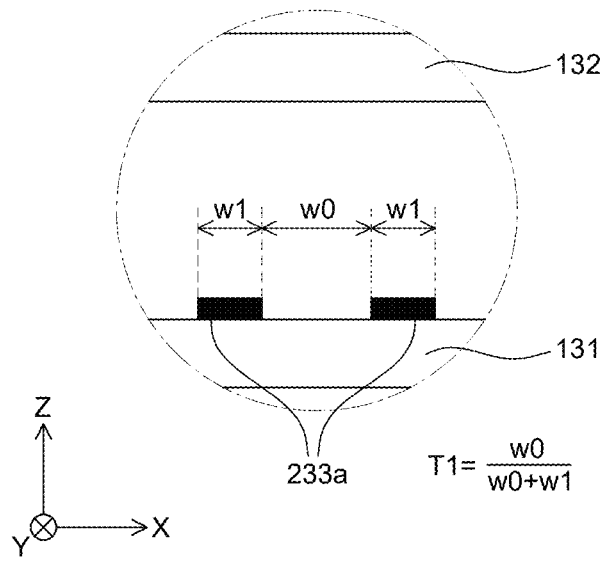
FIG. 8A is an enlarged view illustrating an example of a part EA4 of FIG. 7.
Figure 8B:
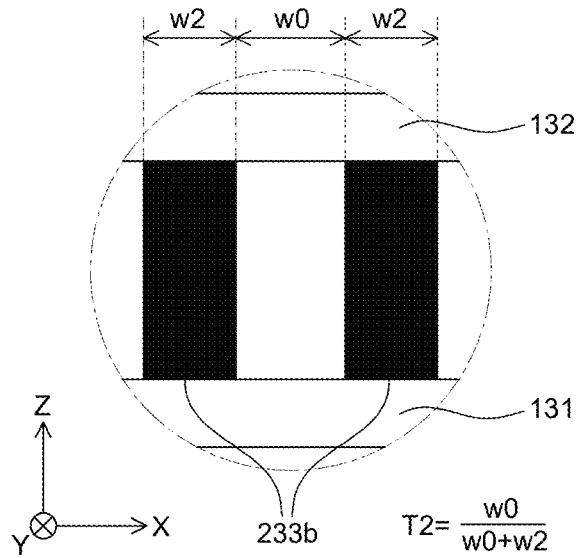
FIG. 8B is an enlarged view illustrating an example of a part EA5 of FIG. 7.
Figure 8C:
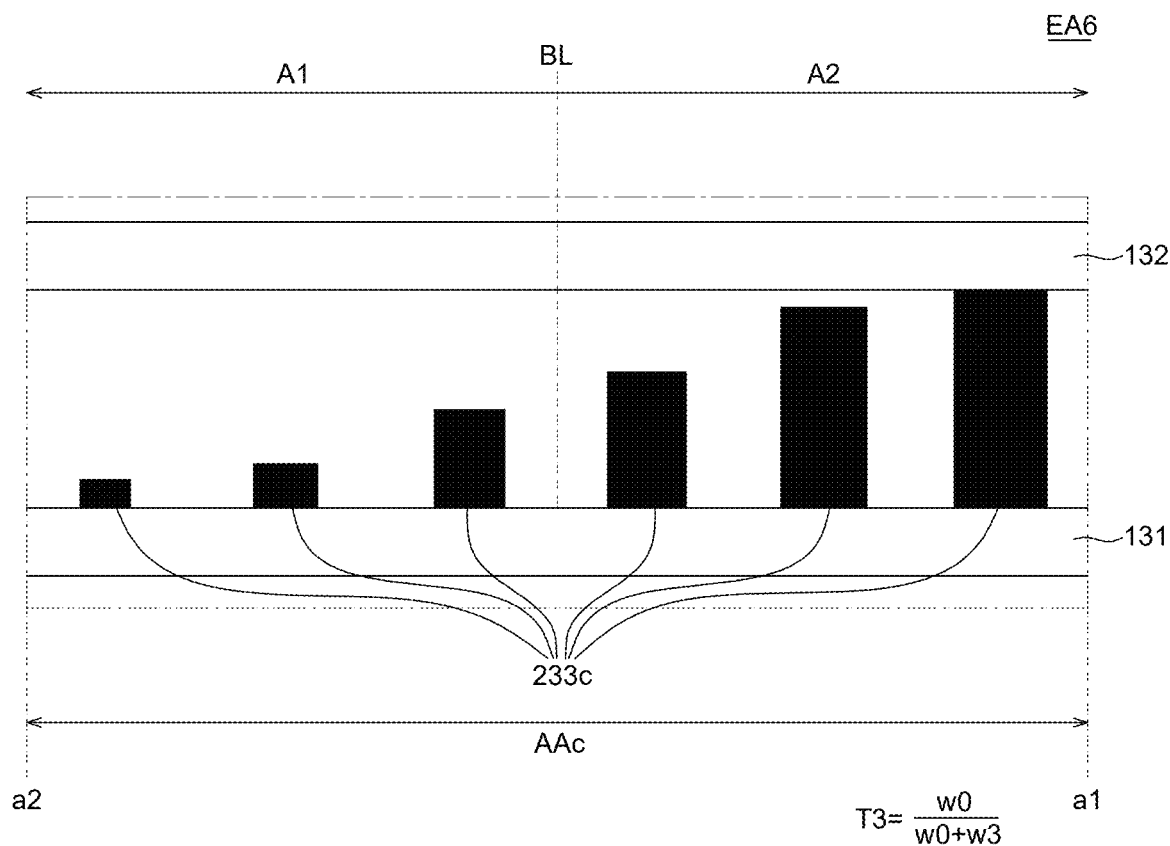
FIG. 8C is an enlarged view illustrating an example of a part EA6 of FIG. 7.
Figure 8C:
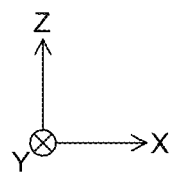

FIG. 7 is a side view schematically illustrating another example of a light controller included in the display device of FIG. 2. FIG. 8A is an enlarged view illustrating an example of a part EA4 of FIG. 7. FIG. 8B is an enlarged view illustrating an example of a part EA5 of FIG. 7. FIG. 8C is an enlarged view illustrating an example of a part EA6 of FIG. 7.

In the meantime, a light controller 230 illustrated in FIG. 7 represents another embodiment of the light controller 130 included in the display device 100 which has been described with reference to FIG. 2.

Further, FIGS. 7 to 8C illustrate a modified embodiment of the embodiment of FIGS. 4 to 5C with regard to the shape and the placement of a plurality of partitions 233 included in a light controller 230. Accordingly, in FIGS. 7 to 8C, in order to avoid a redundant description, differences from the above-described example embodiments will be mainly described.

Referring to FIGS. 2 and 7, the light controller 230 includes a first support member 131, a second support member 132 which is opposite to the first support member 131, and a plurality of partitions 233 disposed between the first support member 131 and the second support member 132. By doing this, the light controller can control a viewing angle or an emission angle of light which travels toward the third direction Z which is perpendicular to the active area AA, according to the first direction X.

The plurality of partitions 233 can be disposed between the first support member 131 and the second support member 132. For example, each of the plurality of partitions 233 extends along the second direction Y and can be disposed to be spaced apart from each other along the first direction X. Accordingly, a space can be formed between the plurality of partitions 233.

The plurality of partitions 233 can be disposed on the entire active area AA. For example, the plurality of partitions 233 can include a plurality of first partitions 233a disposed on the first sub area AAa, a plurality of second partitions 233b disposed on the second sub area AAb, and a plurality of third partitions 233c disposed on the third sub area AAc.

The plurality of partitions 233 has a different height in each area. For example, the plurality of first partitions 233a has a first height h1 which is the smallest height and the plurality of second partitions 233b has a second height h2 which is the largest height. As described above, an emission angle of light emitted from the light controller 230 in the first direction X can be restricted for each area by the plurality of partitions 233 having different heights in each area.

Further, the plurality of third partitions 233c has a height which is equal to or larger than the first height h1 and equal to or smaller than the second height h2. For example, the third height h3 of the plurality of third partitions 233c is increased along the first direction X, for example, along a direction from the first area A1 to the second area A2. Accordingly, the boundary visibility according to the difference in the viewing angle between the first area A1 and the second area A2 can be minimized or reduced.

According to the example embodiment, the third height h3 of the plurality of third partitions 233c can be linearly increased along the first direction X, for example, along a direction from the first area A1 to the second area A2. However, the disclosure is not limited thereto and as described above with reference to FIGS. 4 to 6, the change rate of the third height h3 of the plurality of third partitions 233c can be different in each area.

Further, each of the plurality of partitions 233 can have the shape of a square pillar. For example, the plurality of partitions 233 can have a shape of square pillar in which both side surfaces opposing along the second direction Y are rectangular. Therefore, each of the plurality of partitions 233 can have a rectangular shape as seen from a plane defined by the first direction X and the third direction Z. Therefore, a top surface and a bottom surface of each of the plurality of partitions 233 are parallel to the first support member 131 and the second support member 132. Both side surfaces of the plurality of partitions 233 which are opposite to each other along the first direction X can be perpendicular to the first support member 131 and the second support member 132. For example, both side surfaces of the plurality of partitions 233 which are opposite to each other along the first direction X can be parallel to the third direction Z which is perpendicular to the first support member 131 and the second support member 132.

However, the shape of the plurality of partitions 233 is not limited thereto and the plurality of partitions 233 can have various shapes. For example, the plurality of partitions 233 can also have the shape of a square pillar with both side surfaces which are opposite to each other along the second direction Y in a shape of a trapezoid, an isosceles trapezoid, or other square.

According to the example embodiment, a width of the interval between two adjacent partitions 233, among the plurality of partitions 233, along the first direction X can have a fixed value. However, the disclosure is not limited thereto and the width of the interval can be different in each area.

The plurality of partitions 233 has a different width in each area. As described above, transmittance of light which is incident into the light controller 230 is restricted by the plurality of partitions 233 having different widths in each area.

In the meantime, in the present disclosure, the transmittance can be defined as a percentage (%) of a width of an area in which the partition 233 is not disposed, along the first direction X, to a width of a unit area along the first direction X.

To be more specific, a width of the first partition 233a can be different from a width of the second partition 233b. For example, the width of the first partition 233a is smaller than the width of the second partition 233b. For example, the first partition 233a disposed on the first sub area AAa has a first width and the second partition 233b disposed on the second sub area AAb can have a second width.

For example, further referring to FIG. 8A, the first partition 233a has a first width w1. Here, the first width w1 corresponds to a minimum width of the plurality of partitions 233. In the meantime, as described above, an interval w0 between the plurality of partitions 233, for example, the plurality of first partitions 233a, can have a fixed value.

As described above, in the first sub area AAa, the plurality of first partitions 233a has a first width w1 which is the smallest width so that the most area of the first area A1, for example, the first sub area AAa can ensure a first transmittance T1 which is a relatively high transmittance. For example, the larger the width of the area in which the first partition 233a is not disposed, for example, the interval w0 between the plurality of first partitions 233a and/or the smaller the first width w1 of the first partition 233a, the larger the first transmittance T1. The first partition 233a has the first width w1 which is the smallest width and the interval w0 has a fixed value so that in the first sub area AAa of the entire area, the first transmittance T1 which is the largest transmittance can be ensured.

Further referring to FIG. 8B, the second partition 233b can have a second width w2. Here, the second width w2 can correspond to a maximum width of the plurality of partitions 233. In the meantime, as described above, the interval w0 between the plurality of partitions 233, for example, the plurality of second partitions 233b can have the fixed value, for example, have the same value or substantially same value as the interval w0 between the plurality of first partitions 233a.

As described above, in the second sub area AAb, the plurality of second partitions 233b has a second width w2 which is the largest width so that the most area of the second area A2, for example, the second sub area AAb can ensure a second transmittance T2 which is a relatively low transmittance. For example, the larger the width of the area in which the second partition 233b is not disposed, for example, the interval w0 between the plurality of second partitions 233b and/or the smaller the second width w2 of the second partition 233b, the larger the second transmittance T2. The second partition 233b has the second width w2 which is the largest width and the interval w0 has a fixed value so that in the second sub area AAb of the entire area, the second transmittance T2 which is the smallest transmittance can be ensured.

As described above, in order to ensure a high emission angle in the light controller 230, it is necessary to ensure a relatively high transmittance. Accordingly, an emission angle requested to display an image at the first viewing angle, for example, an emission angle which is larger than the emission angle in the second sub area AAb can be ensured in the first area A1 in which the image is displayed at the first viewing angle which is a wide viewing angle, regardless of the driving mode, for example, in the first sub area AAa.

Accordingly, in the case of an image which is displayed by light emitted from the first light source unit 110, in the first area A1 including a first sub area AAa in which the plurality of first partitions 233a having the first width w1 which is the smallest width is disposed, light is emitted according to an emission angle requested for the first area A1 by ensuring a predetermined transmittance, for example, a first transmittance T1 to display an image at the first viewing angle. Further, in the second area A2 including a second sub area AAb in which the plurality of second partitions 233b having the second width w2 which is the largest width is disposed, light is emitted at an emission angle which is smaller than that in the first area A1 by a transmittance which is smaller than that in the first area A1, for example, a second transmittance T2 to control the viewing angle to a second viewing angle to display an image.

Further, referring to FIGS. 7 and 8C, the plurality of third partitions 233c can have a width which is equal to or larger than the first width w1 and is equal to or smaller than the second width w2. For example, the third width w3 of the plurality of third partitions 233c is gradually increased toward the first direction X. For example, the third width w3 of the plurality of third partitions 233c is gradually increased from the first area A1 or the first sub area AAa to the second area A2 or the second sub area AAb. For example, a third partition 233c, among the plurality of third partitions 233c, which is the most adjacent to the first sub area AAa has the first width w1 which is the same as or similar to the first partition 233a. A third partition 233c, among the plurality of third partitions 233c, which is the most adjacent to the second sub area AAb has the second width w2 which is the same as or similar to the second partition 233b. The remaining third partition 133c, among the plurality of third partitions 233c, has a third width w3 between the first width w1 and the second width w2 and the third width w3 can be increased toward the first direction X.

In other words, from the vicinity of the boundary line BL between the first area A1 and the second area A2, the third width w3 of the plurality of third partitions 233c can be gradually increased toward the first direction X, for example, a direction directed to the second sub area AAb or the second area A2. In this case, the interval w0 between the plurality of partitions 233 has a fixed value so that a transmittance, for example, a third transmittance T3 in the third sub area AAc can be gradually decreased from the vicinity of the boundary line BL between the first area A1 and the second area A2 toward the first direction X, for example, a direction toward the second sub area AAb or the second area A2.

Accordingly, in the case of the image which is displayed by light, which is incident to the light controller 230, the third transmittance T3 is gradually changes in the boundary part between the second area A2 and the first area A1 so that a boundary visibility according to a viewing angle difference of the first area A1 and the second area A2 can be minimized or reduced. In the second area A2, a viewing angle is entirely restricted to display an image at a second viewing angle, for example, a narrow viewing angle and in the first area A1, the viewing angle is not substantially restricted to display an image at a first viewing angle, for example, a wide viewing angle.

Further, a change rate of the third width w3 of the third partition 233c, for example, an increase rate of the third width w3 of the third partition 233c along the first direction X or a decrease rate of the third width w3 of the third partition 233c along an opposite direction to the first direction X can be different in each area. In other words, the change rate of the third transmittance T3 in the third sub area AAc, for example, a decrease rate of the third transmittance T3 along the first direction X in the third sub area AAc or an increase rate of the third transmittance T3 along an opposite direction to the first direction X can be different in each area.

For example, the closer to the center portion of the third sub area AAc, for example, the boundary line BL, the larger the change rate of the third width w3 of the third partition 233c and the closer to the first sub area AAa and the second sub area AAb, the smaller the change rate. In other words, the closer to the center portion of the third sub area AAc, for example, the boundary line BL, the larger the change rate of the third transmittance T3 in the third sub area AAc, and the closer to the first sub area AAa and the second sub area AAb, the smaller the change rate.

In this case, as illustrated in FIG. 8C, the third width w3 of the third partition 233c is gently changed in an area relatively adjacent to the first sub area AAa and the second sub area AAb. Further, the third width w3 of the third partition 233c can be sharply changed in an area which is relatively far from the first sub area AAa and the second sub area AAb, for example, in the vicinity of the boundary line BL. In this case, the third transmittance T3 in the third sub area AAc is gently changed in an area relatively adjacent to the first sub area AAa and the second sub area AAb. Further, the third transmittance T3 of the third sub area AAc can be sharply changed in an area which is relatively far from the first sub area AAa and the second sub area AAb, for example, in the vicinity of the boundary line BL.

As described above, in an area adjacent to the second sub area AAb in which a viewing angle or an emission angle of light incident from the bottom of the light controller 230 is controlled and an area adjacent to the first sub area AAa in which a viewing angle or an emission angle of the light is not substantially controlled, the third width w3 of the third partition 233c is gently changed. Therefore, the third transmittance T3 in the third sub area AAc is gently changed in areas adjacent to the first sub area AAa and the second sub area AAb and the boundary visibility in the boundary portion between the first area A1 and the second area A2 can be more effectively improved.

As described above, in the case of an image displayed by light provided from the bottom of the light controller 230, for example, the first light source unit 110, a plurality of second partitions 233b having a second width w2 is disposed on the most area of the second area A2, for example, on the second sub area AAb, so that in the second area A2, the second transmittance T2 which is the smallest transmittance is ensured to be controlled to the second viewing angle to display the image. Further, for example, a plurality of first partitions 233a having a first width w1 which is smaller than the second width w2 is disposed on the most area of the first area A1, for example, on the first sub area AAa, so that in the first area A1, the first transmittance T1 which is the largest transmittance is ensured. Therefore, the viewing angle is not substantially controlled to display the image at the first viewing angle.

Further, a third width w3 of the plurality of third partitions 233c disposed in an area in the vicinity of the boundary line BL between the first area A1 and the second area A2 in which the viewing angle is controlled to be different according to the driving mode, for example, in the third sub area AAc is equal to or larger than the first width w1 or equal to or smaller than the second width w2. Further, the third width w3 is designed to be gradually changed toward one direction so that the third transmittance T3 is gradually changed along one direction in the third sub area AAc, to minimize or reduce the boundary visibility between the first area A1 and the second area A2.

Specifically, the closer to the center portion of the third sub area AAc, for example, the boundary line BL, the larger the change rate of the third width w3 of the third partition 233c and the closer to the first sub area AAa and the second sub area AAb, the smaller the change rate. Accordingly, the closer to the boundary line BL, the larger the change rate of the third transmittance T3 in the third sub area AAc, and the closer to the first sub area AAa and the second sub area AAb, the smaller the change rate. Accordingly, the boundary visibility between the first area A1 and the second area A2 can be more effectively improved.

Figure 9:
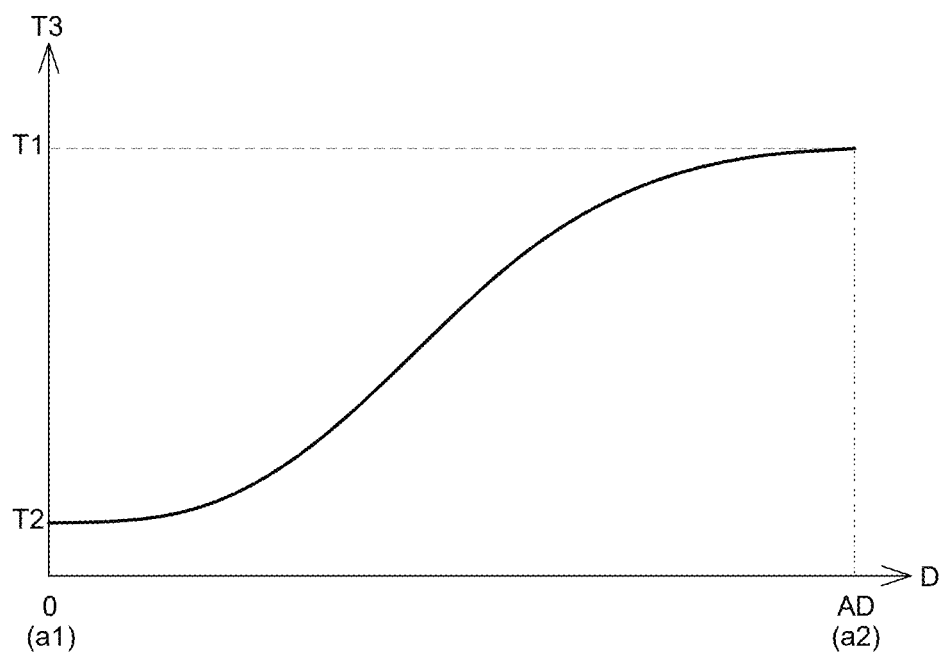
FIG. 9 is a graph for explaining an example of a width of a third partition included in a light controller of FIG. 7 and a transmittance of a third sub area.

FIG. 9 is a graph for explaining an example of a width of a third partition included in a light controller of FIG. 7 and a transmittance of a third sub area.

Particularly, FIG. 9 illustrates a graph of a third transmittance T3 in the third sub area AAc with respect to the distance D according to an opposite direction to the first direction X which is a direction of the first sub area AAa, with respect to the boundary of the second sub area AAb and the third sub area AAc, for example, a first position a1 illustrated in FIG. 8C.

In the meantime, as described above, the transmittance is defined as a percentage (%) of a width of an area in which the partition 233 is not disposed, along the first direction X, to a width of a unit area along the first direction X. An interval w0 between two adjacent partitions 233, for example, two adjacent third partitions 233c is a fixed value so that the third transmittance T3 in the third sub area AAc can be determined by the third width w3 of the third partition 233c. For example, the third width w3 and the third transmittance T3 can be inversely proportional to each other.

Accordingly, hereinafter, a value and a change rate of a third width w3 which is determined by the third transmittance T3 will be described together with a value and a change rate of the third transmittance T3 in the third sub area AAc.

Referring to FIGS. 7, 8C, and 9, the third transmittance T3 can be increased toward an opposite direction to the first direction X, for example, toward a direction from the second area A2 to the first area A1. For example, the third transmittance T3 can be increased from the first position a1 which is the boundary between the second sub area AAb and the third sub area AAc to the second position a2 which is the boundary between the first sub area AAa and the third sub area AAc.

Further, the change rate of the third transmittance T3 can be different in each area. Here, a change rate of the third transmittance T3 is an absolute value of the slope of the tangent line of the graph illustrated in FIG. 9, and can refer to a decrease rate of the third transmittance T3 along the first direction X or an increase rate of the third transmittance T3 along an opposite direction to the first direction X. For example, the closer to the first position a1 and/or the second position a2, the smaller the change rate of the third transmittance T3 and the farther from the first position a1 and the second position a2, for example, the closer to the boundary line BL between the first area A1 and the second area A2 as a center portion of the third sub area AAc, the larger the change rate of the third transmittance. For example, the change rate of the third transmittance T3 has the substantially same value in the first position a1 and the second position a2, for example, has a minimum value. Accordingly, as descried above, the third transmittance T3 is gently changed in an area relatively adjacent to the first sub area AAa and the second sub area AAb. Further, the third transmittance T3 can be sharply changed in an area which is relatively far from the first sub area AAa and the second sub area AAb, for example, in the vicinity of the boundary line BL.

To be more specific, a value of the third transmittance T3 can have a value obtained by applying a trigonometric function to the distance D from the first position a1. To be more specific, a value of the third transmittance T3 can have a value obtained by applying a cosine or sine function to the distance D from the first position a1.

For example, the third transmittance T3 can be calculated by the following Equation 2.

$$T3 = \frac{T1+T2}{2} + \left(\frac{T1-T2}{2}\right) \cdot \cos\left(\frac{D\pi}{AD} + \pi\right) \qquad \text{[Equation 2]}$$

In Equation 2, T3 is a third transmittance T3 in the third sub area AAc, T1 is a first transmittance T1 in the first sub area AAa, T2 is a second transmittance T2 in the second sub area AAb, D is a distance D from the first position a1 along an opposite direction to the first direction X, and AD is an area width AD of the third sub area AAc.

In Equation 2, D is a distance D along an opposite direction to the first direction X from the first position a1 and is defined in the third sub area AAc. As illustrated in FIG. 9, a value of D has 0 when the position is the first position a1 and can have an area width AD of the third sub area AAc when the position is the second position a2. For example, D can have a value which is equal to or larger than 0 or is equal to and smaller than AD.

Equation 2 will be described in more detail. With respect to the "cos(Dπ/AD)+π" term, since D has a value equal to or larger than 0 and equal to or smaller than AD as described above, when the corresponding position is between the first position a1 and the second position a2 within the third sub area AAc, the value of the "(Dπ/AD)+π" term has a value equal to or larger than π and equal to or smaller than 2π. Accordingly, the value of the "cos(Dπ/AD)+π" term has a value equal to or larger than −1 and equal to or smaller than 1, and can increase from the first position a1 to the second position a2. For example, a value of the "cos(Dπ/AD)+π" term is −1 in the first position a1 and 1 in the second position a2. Here, according to the property of the trigonometric function, for example, the cosine function, the value of the "cos(Dπ/AD)+π" term can gently increase in the first position a1 and the second position a2, for example, increase at an increase rate with a relatively small value.

Further, the "cos(Dπ/AD)+π" term has a value which is equal to or larger than −1 and equal to or smaller than 1, so that according to Equation 2, as illustrated in FIG. 9, a value of the third transmittance T3 has a value which is equal to or larger than the second transmittance T2 and equal to or smaller than the first transmittance T1 and increases from the first position a1 to the second position a2. For example, according to the change rate of the value of the "cos(Dπ/AD)+π" term according to the position, the value of the third transmittance T3 gently can increase in the first position a1 and the second position a2, for example, increase with a minimum increase rate or change rate. Further, the value of the third transmittance T3 can increase in the boundary line BL between the first area A1 and the second area A2, for example, in an intermediate point of the first position a1 and the second position a2, with a maximum increase rate or change rate.

The third width w3 of the third partition 233c can be reduced toward an opposite direction to the first direction X, for example, toward a direction from the second area A2 to the first area A1, according to the change of the third transmittance T3 for every position. For example, the third width w3 can be decreased from the first position a1 which is the boundary line BL between the second sub area AAb and the third sub area AAc to the second position a2 which is the boundary line BL between the first sub area AAa and the third sub area AAc.

Further, the change rate of the third width w3 can be different in each area. Here, the change rate of the third width w3 refers to an increase rate of the third width w3 along the first direction X or a decrease rate of the third width w3 along an opposite direction to the first direction X. For example, the closer to the first position a1 and/or the second position a2, the smaller the change rate of the third width w3 and the farther from the first position a1 and the second position a2, for example, the closer to the boundary line BL between the first area A1 and the second area A2 as a center portion of the third sub area AAc, the larger the change rate of the third width w3. For example, the change rate of the third width w3 of the third partition 233c has the substantially same value in the first position a1 and the second position a2, for example, has a minimum value. Accordingly, as descried above, the third width w3 is gently changed in an area relatively adjacent to the first sub area AAa and the second sub area AAb. Further, the third width w3 can be sharply changed in an area which is relatively far from the first sub area AAa and the second sub area AAb, for example, in the vicinity of the boundary line BL.

For example, the third width w3 can be calculated by the following Equation 3.

$$w3 = \frac{w0}{T3} - w0 \quad \text{[Equation 3]}$$

In Equation 3, w3 is a third width w3 of the third partition 233c, w0 is, a fixed value, an interval w0 between two adjacent third partitions 233c, and T3 is a third transmittance T3 in the third sub area AAc. In the meantime, the third transmittance T3 can be calculated by the above-described Equation 2.

Equation 3 is derived by an equation for the third transmittance T3 of the third sub area AAc determined according to an interval w0 between two adjacent third partitions 233c and the third width w3 of the third partition 233c.

Accordingly, the third width w3 of the third partition 233c is inversely proportional to the third transmittance T3 and the value can be reduced as it goes from the first position a1 to the second position a2. The closer to the first position a1 and/or the second position a2, the smaller the change rate of the third width w3 and the farther from the first position a1 and the second position a2, for example, the closer to the boundary line BL between the first area A1 and the second area A2 as a center portion of the third sub area AAc, the larger the change rate of the third width w3.

As described above, in the third sub area AAc in which the plurality of third partitions 233c with a width which varies according to the position is disposed, as an area including the boundary line BL of the first area A1 and the second area A2, the third width w3 of the third partition 233c disposed on the third sub area AAc is gently changed in an area adjacent to the second sub area AAb in which a viewing angle or an emission angle of light incident from the bottom of the light controller 230 is controlled and an area adjacent to the first sub area AAa in which the viewing angle or the emission angle of the light is not substantially controlled. Accordingly, the third transmittance T3 in the third sub area AAc in which the transmittance is changed according to the position is gently changed in an area adjacent to the first sub area AAa and an area adjacent to the second sub area AAb, so that the boundary visibility in the boundary portion between the first area A1 and the second area A2 can be more effectively improved.

Figure 10:
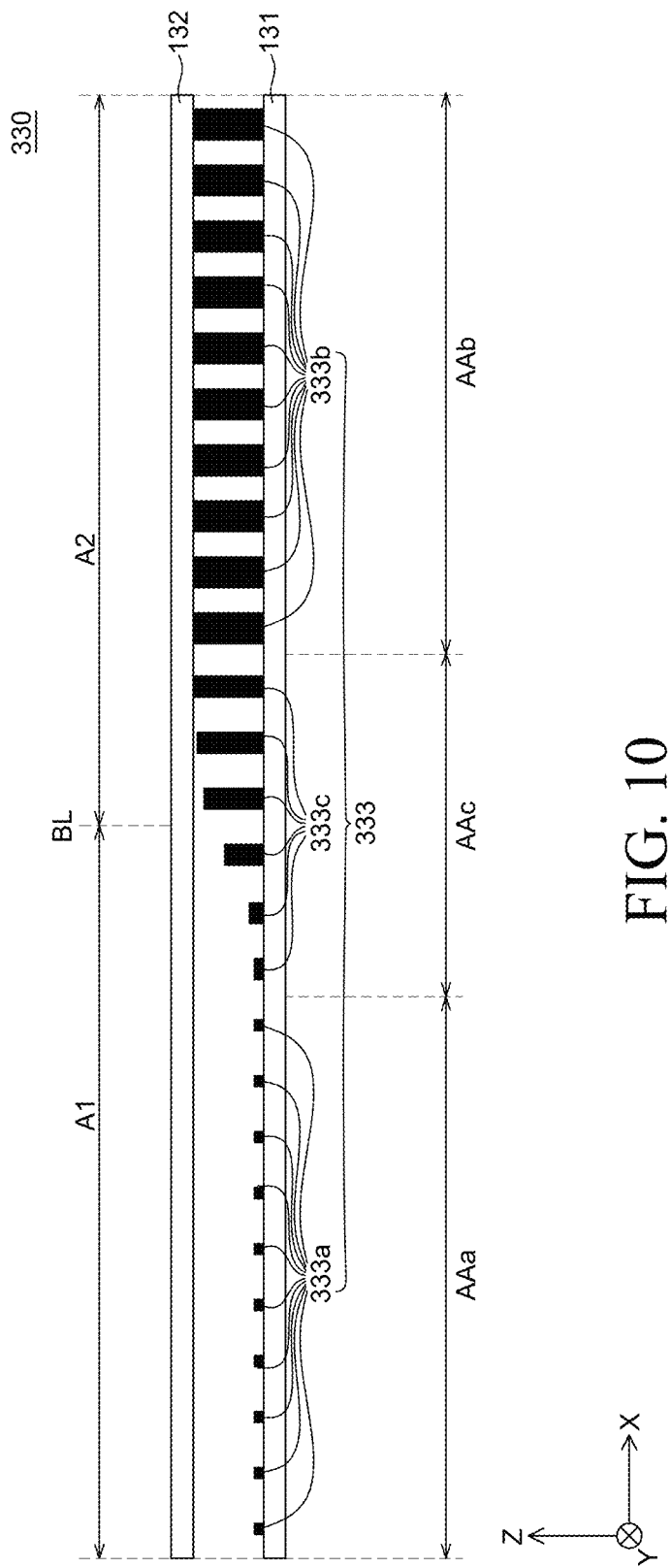
FIG. 10 is a side view schematically illustrating still another example of a light controller included in the display device of FIG. 2.

FIG. 10 is a side view schematically illustrating still another example of a light controller included in the display device of FIG. 2.

In the meantime, a light controller 230 illustrated in FIG. 10 represents still another example of the light controller 130 included in the display device 100 which has been described with reference to FIG. 2.

Further, FIG. 10 illustrates a modified embodiment of the embodiment of FIGS. 4 to 5C with regard to the shape and the placement of a plurality of partitions 333 included in a light controller 330. Accordingly, in FIG. 10, in order to avoid a redundant description, differences from the above-described example embodiments will be mainly described.

Referring to FIGS. 2 and 10, the light controller 330 includes a first support member 131, a second support member 132 which is opposite to the first support member 131, and a plurality of partitions 333 disposed between the first support member 131 and the second support member 132. By doing this, the light controller can control a viewing angle or an emission angle of light which travels toward the third direction Z which is perpendicular to the active area AA, according to the first direction X.

The plurality of partitions 333 can be disposed between the first support member 131 and the second support member 132. For example, each of the plurality of partitions 333 extends along the second direction Y and can be spaced apart from each other along the first direction X. Accordingly, a space can be formed between the plurality of partitions 333.

Further, each of the plurality of partitions 333 can have the shape of a square pillar. For example, the plurality of partitions 333 can have a shape of square pillar in which both side surfaces opposing along the second direction Y are rectangular. Therefore, each of the plurality of partitions 333 can have a rectangular shape as seen from a plane defined by the first direction X and the third direction Z. Therefore, a top surface and a bottom surface of each of the plurality of partitions 333 are parallel to the first support member 131 and the second support member 132. Both side surfaces of the plurality of partitions 333 which are opposite to each other along the first direction X are perpendicular to the first support member 131 and the second support member 132. For example, both side surfaces of the plurality of partitions 333 which are opposite to each other along the first direction X can be parallel to the third direction Z which is perpendicular to the first support member 131 and the second support member 132.

However, the shape of the plurality of partitions 333 is not limited thereto and the plurality of partitions 333 can have various shapes. For example, the plurality of partitions 333 can have the shape of a square pillar with both side surfaces which are opposite to each other along the second direction Y in a shape of a trapezoid, an isosceles trapezoid, or other square.

According to the example embodiment, a width of the interval between two adjacent partitions 333, among the plurality of partitions 333, along the first direction X can have a fixed value. However, the disclosure is not limited thereto and the width of the interval can be different in each area.

The plurality of partitions 333 can be disposed on the entire active area AA. For example, the plurality of partitions 333 can include a plurality of first partitions 333*a* disposed on the first sub area AAa, a plurality of second partitions 333*b* disposed on the second sub area AAb, and a plurality of third partitions 333*c* disposed on the third sub area AAc.

The plurality of partitions 333 can have a different height in each area. For example, the plurality of first partitions 333*a* can have a first height h1 which is the smallest height and the plurality of second partitions 333*b* can have a second height h2 which is the largest height. As described above, an emission angle of light emitted from the light controller 330 in the first direction X can be restricted for each area by the plurality of partitions 333 having different heights in each area.

Further, the plurality of third partitions 333*c* can have a height which is equal to or larger than the first height h1 and equal to or smaller than the second height h2. For example, the third height h3 of the plurality of third partitions 333*c* can be increased along the first direction X, for example, along a direction from the first area A1 to the second area A2. Accordingly, the boundary visibility between the first area A1 and the second area A2 according to the difference in the viewing angle can be minimized or reduced.

According to the example embodiment, a change rate of the third height h3 of the third partition 333*c* can be different in each area. For example, as described with reference to FIGS. 4 to 6, the closer to the first position a1 which is a boundary between the second sub area AAb and the third sub area AAc and the second position a2 which is a boundary between the first sub area AAa and the third sub area AAc, the larger the change rate of the third height h3. Further, the farther the first position a1 and the second position a2, for example, the close to the boundary line BL between the first area A1 and the second area A2, the larger the change rate of the third height. Accordingly, the boundary visibility in the boundary portion between the first area A1 and the second area A2 can be more effectively improved.

Further, the plurality of partitions 333 can have a different width in each area. For example, the plurality of first partitions 333*a* has a first width w1 which is the smallest width and the plurality of second partitions 333*b* has a second width w2 which is the largest width. As described above, a transmittance different in each area can be ensured by the plurality of partitions 333 having a width different in each area. For example, in the first sub area AAa in which the first partition 333*a* has a first width w1 which is the smallest width, the first transmittance T1 which is the largest transmittance is ensured. Further, in the second sub area AAb in which the second partition 333*b* has a second width w2 which is the largest width, the second transmittance T2 which is the smallest transmittance is ensured. Accordingly, in the first area A1 including the first sub area AAa, a predetermined transmittance, for example, the first transmittance T1 is ensured so that light is emitted according to an emission angle requested in the first area A1 to display an image at the first viewing angle. Further, in the second area A2 including the second sub area AAb, light is emitted at an emission angle which is smaller than that in the first area A1 by a transmittance which is smaller than that in the first area A1, for example, the second transmittance T2 is ensured to control the viewing angle to the second viewing angle to display an image.

Further, the plurality of third partitions 333*c* can have a height which is equal to or larger than the first width w1 and equal to or smaller than the second width w2. For example, the third width w3 of the plurality of third partitions 333*c* can be increased along the first direction X, for example, along a direction from the first area A1 to the second area A2. Accordingly, the boundary visibility between the first area A1 and the second area A2 according to the difference in the viewing angle can be minimized or reduced.

According to the example embodiment, a change rate of the third width w3 of the plurality of third partition 333*c* can be different in each area. For example, as described with reference to FIGS. 7 to 9, the closer to the first position a1 which is a boundary between the second sub area AAb and the third sub area AAc and the second position a2 which is a boundary between the first sub area AAa and the third sub area AAc, the larger the change rate of the third width w3. Further, the farther the first position a1 and the second position a2, for example, the close to the boundary line BL between the first area A1 and the second area A2, the larger the change rate of the third width.

According to the value of the third width w3 as described above, the third transmittance T3 in the third sub area AAc can be different in each area. For example, as described with reference to FIGS. 7 to 9, the closer to the first position a1 which is a boundary between the second sub area AAb and the third sub area AAc and the second position a2 which is a boundary between the first sub area AAa and the third sub area AAc, the larger the change rate of the third transmittance T3. Further, the farther the first position a1 and the second position a2, for example, the close to the boundary line BL between the first area A1 and the second area A2, the larger the change rate of the third transmittance. Accordingly, the boundary visibility in the boundary portion between the first area A1 and the second area A2 can be more effectively improved.

The example embodiments of the present disclosure can also be described as follows:

According to an aspect of the present disclosure, there is provided a display device. The display device comprises a first light source unit including a plurality of first light sources, a light controller which is disposed on the first light source unit and includes a plurality of partitions overlapping at least a partial area of the active area, a second light source unit which is disposed on the light controller and includes a plurality of second light sources, a light guide plate which is disposed to be parallel to the second light source unit and guides light provided from the second light source unit, and a display panel which is disposed on the light guide plate and displays an image using light provided from the first light source unit or the second light source unit, wherein the plurality of partitions has a different height in each area and a change rate of a height of the plurality of partitions is different in each area.

The active area can include a first area in which an image is displayed at a first viewing angle in each of a first mode and a second mode, and a second area in which an image is displayed at the first viewing angle in the first mode and an image is displayed at a second viewing angle which is smaller than the first viewing angle in the second mode.

The plurality of partitions can include a plurality of first partitions which is disposed on a first sub area which is a partial area of the first area and has a first height, a plurality of second partitions which is disposed on a second sub area which is a partial area of the second area and has a second height which is larger than the first height, and a plurality of third partitions which is disposed on a third sub area between the first sub area and the second sub area and has a third height which is equal to or larger than the first height and is equal to or smaller than the second height.

The third height can be decreased from the second sub area to the first sub area.

The closer to a boundary between the first sub area and the third sub area and a boundary between the second sub area and the third sub area, the smaller the change rate of the third height.

A change rate of the third height in the boundary between the first sub area and the third sub area and a change rate of the third height in the boundary between the second sub area and the third sub area can be the same or substantially same.

The closer to the boundary line between the first area and the second area, the larger the change rate of the third height.

According to another aspect of the present disclosure, there is provided a display device. The display device comprises a first light source unit including a plurality of first light sources, a light controller which is disposed on the first light source unit and includes a plurality of partitions overlapping at least a partial area of the active area, a second light source unit which is disposed on the light controller and includes a plurality of second light sources, a light guide plate which is disposed to be parallel to the second light source unit and guides light provided from the second light source unit, and a display panel which is disposed on the light guide plate and displays an image using light provided from the first light source unit or the second light source unit, wherein the plurality of partitions has a different width in each area and a change rate of a width of the plurality of partitions is different in each area.

The active area can include a first area in which an image is displayed at a first viewing angle in a first mode and a second mode, and a second area in which an image is displayed at the first viewing angle in the first mode and an image is displayed at a second viewing angle which is smaller than the first viewing angle in the second mode.

The plurality of partitions can include a plurality of first partitions which is disposed on a first sub area which is a partial area of the first area and has a first width, a plurality of second partitions which is disposed on a second sub area which is a partial area of the second area and has a second width which is larger than the first width, and a plurality of third partitions which is disposed on a third sub area between the first sub area and the second sub area and has a third width which is equal to or larger than the first width and is equal to or smaller than the second width.

The third width can be decreased from the second sub area to the first sub area.

The closer to a boundary between the first sub area and the third sub area and a boundary between the second sub area and the third sub area, the smaller the change rate of the third width.

A change rate of the third width in the boundary between the first sub area and the third sub area and a change rate of the third width in the boundary between the second sub area and the third sub area can be the same or substantially same.

The closer to the boundary line between the first area and the second area, the larger the change rate of the third width.

Although the example embodiments of the present disclosure have been described in detail with reference to the accompanying drawings, the present disclosure is not limited thereto and can be embodied in many different forms without departing from the technical concept of the present disclosure. Therefore, the example embodiments of the present disclosure are provided for illustrative purposes only but not intended to limit the technical concept of the present disclosure. The scope of the technical concept of the present disclosure is not limited thereto. Therefore, it should be understood that the above-described example embodiments are illustrative in all aspects and do not limit the present disclosure. All the technical concepts in the equivalent scope of the present disclosure thereof should be construed as falling within the scope of the present disclosure.

What is claimed is:

1. A display device, comprising:
a display panel including an active area;
a first light source unit including a plurality of first light sources;
a light controller disposed on the first light source unit and including a plurality of partitions overlapping at least a partial area of the active area;
a second light source unit disposed on the light controller and including a plurality of second light sources; and
a light guide plate disposed to be parallel to the second light source unit and configured to guide light provided from the second light source unit,
wherein the display panel is disposed on the light guide plate and is configured to display an image using light provided from the first light source unit or the second light source unit,
wherein the plurality of partitions has a different height in each area, and
wherein a change rate of a height of the plurality of partitions is different in each area.

2. The display device according to claim 1, wherein the active area includes:
a first area in which an image is displayed at a first viewing angle in each of a first mode and a second mode; and a second area in which an image is displayed at the first viewing angle in the first mode and an image is displayed at a second viewing angle which is smaller than the first viewing angle in the second mode.

3. The display device according to claim 2, wherein the plurality of partitions includes:
   a plurality of first partitions disposed on a first sub area which is a partial area of the first area, the plurality of first partitions having a first height;
   a plurality of second partitions disposed on a second sub area which is a partial area of the second area, the plurality of second partitions having a second height which is larger than the first height; and
   a plurality of third partitions disposed on a third sub area between the first sub area and the second sub area, the plurality of third partitions having a third height which is equal to or larger than the first height and is equal to or smaller than the second height.

4. The display device according to claim 3, wherein the third height is decreased from the second sub area to the first sub area.

5. The display device according to claim 4, wherein the closer to a boundary between the first sub area and the third sub area and a boundary between the second sub area and the third sub area, the smaller a change rate of the third height.

6. The display device according to claim 5, wherein the change rate of the third height in the boundary between the first sub area and the third sub area and a change rate of the third height in the boundary between the second sub area and the third sub area are the same.

7. The display device according to claim 4, wherein the closer to a boundary line between the first area and the second area, the larger a change rate of the third height.

8. A display device, comprising:
   a display panel including an active area;
   a first light source unit including a plurality of first light sources;
   a light controller disposed on the first light source unit and including a plurality of partitions overlapping at least a partial area of the active area;
   a second light source unit disposed on the light controller and including a plurality of second light sources; and
   a light guide plate disposed to be parallel to the second light source unit and configured to guide light provided from the second light source unit,
   wherein the display panel is disposed on the light guide plate and is configured to display an image using light provided from the first light source unit or the second light source unit, and
   wherein the plurality of partitions has a different width in each area and a change rate of a width of the plurality of partitions is different in each area.

9. The display device according to claim 8, wherein the active area includes:
   a first area in which an image is displayed at a first viewing angle in a first mode and a second mode; and
   a second area in which an image is displayed at the first viewing angle in the first mode and an image is displayed at a second viewing angle which is smaller than the first viewing angle in the second mode.

10. The display device according to claim 9, wherein the plurality of partitions includes:
    a plurality of first partitions disposed on a first sub area which is a partial area of the first area, the plurality of first partitions having a first width;
    a plurality of second partitions disposed on a second sub area which is a partial area of the second area, the plurality of second partitions having a second width which is larger than the first width; and
    a plurality of third partitions disposed on a third sub area between the first sub area and the second sub area, the plurality of third partitions having a third width which is equal to or larger than the first width and is equal to or smaller than the second width.

11. The display device according to claim 10, wherein the third width is decreased from the second sub area to the first sub area.

12. The display device according to claim 11, wherein the closer to a boundary between the first sub area and the third sub area and a boundary between the second sub area and the third sub area, the smaller a change rate of the third width.

13. The display device according to claim 12, wherein the change rate of the third width in the boundary between the first sub area and the third sub area and a change rate of the third width in the boundary between the second sub area and the third sub area are the same.

14. The display device according to claim 11, wherein the closer to a boundary line between the first area and the second area, the larger a change rate of the third width.

\* \* \* \* \*